(12) United States Patent  (10) Patent No.: US 7,690,915 B2
Furutani et al.  (45) Date of Patent: Apr. 6, 2010

(54) MOLD CLAMPING MECHANISM AND INJECTION MOLDING MACHINE

(75) Inventors: Muneo Furutani, Aichi-ken (JP); Toshio Maruyama, Aichi-ken (JP); Toshihiko Mizutani, Aichi-ken (JP); Akio Yamaguchi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 396 days.

(21) Appl. No.: 11/905,153

(22) Filed: Sep. 27, 2007

(65) Prior Publication Data

US 2008/0081086 A1  Apr. 3, 2008

(30) Foreign Application Priority Data

Sep. 29, 2006  (JP) .............................. 2006-267548
Aug. 29, 2007  (JP) .............................. 2007-222258

(51) Int. Cl.
*B29C 45/66* (2006.01)
(52) U.S. Cl. .................................... 425/595; 425/451.7
(58) Field of Classification Search .............. 425/451.7, 425/451.9, 595
See application file for complete search history.

(56) References Cited

U.S. PATENT DOCUMENTS 2,976,569 A * 3/1961 Quere et al. ............. 425/451.2
5,618,487 A * 4/1997 Hettinga ..................... 425/595

FOREIGN PATENT DOCUMENTS

JP            5-269748        10/1993

* cited by examiner

*Primary Examiner*—James Mackey
(74) *Attorney, Agent, or Firm*—Posz Law Group, PLC

(57) ABSTRACT

A second metal mold 15 has a through hole 31 that extends in the movement direction of the second metal mold 15. A first metal mold 14 has an internal threaded portion 34 that extends on a common line with the through hole 31 and has an opening at the surface of the first metal mold 14 facing the second metal mold 15. A bolt 39 formed by a shaft 37 and a head 38 is employed. The shaft 37 is passed through the through hole 31 in such a manner that the head 38 is arranged on the opposite side to the first metal mold 14 with respect to the second metal mold 15, and the distal end of the shaft 37 is located at the same side as the first metal mold 14 with respect to the second metal mold 15. When the second metal mold 15 is held in contact with the first metal mold 14, the bolt 39 is rotated by an electric motor 45 through the head 38. In this manner, an external thread 41, which is formed at the distal end of the shaft 37, is threaded to the internal threads 36 of the internal threaded portion 34. This presses the second metal mold 15 against the first metal mold 14.

17 Claims, 13 Drawing Sheets

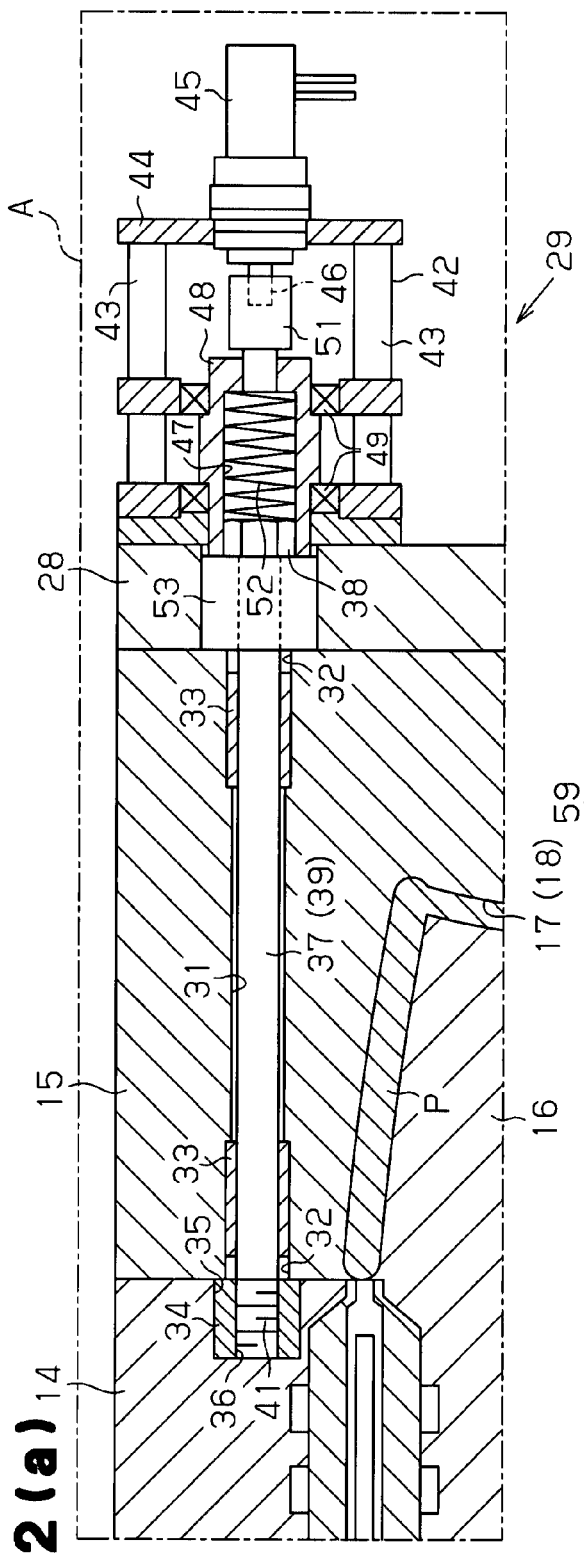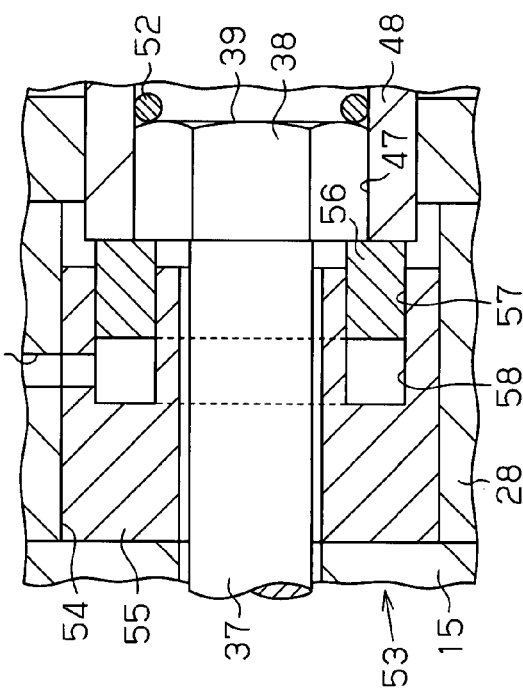

Front ← → Rear

MOLD CLAMPING MECHANISM AND INJECTION MOLDING MACHINE

BACKGROUND OF THE INVENTION

The present invention relates to a mold clamping mechanism that clamps a pair of molds under high pressure in molding of resin and an injection molding machine using the mold clamping mechanism.

The injection molding machine has a mechanism (a mold clamping mechanism) that clamps metal molds continuously from when injection of molten resin is started to when the resin completely solidifies in order to prevent the metal molds from being separated from each other by the pressure produced through the injection of the molten resin.

As the mold clamping mechanism, for example, a type shown in FIG. 14 is known. Specifically, a mold clamping mechanism 71 has a fixed die plate 72 and a rear plate 73, which are connected together by a plurality of tie bars (shafts) 74. A movable die plate 75 is arranged between the fixed die plate 72 and the rear plate 73. Each of the tie bars 74 is passed through the movable die plate 75. A first metal mold 76 is attached to the fixed die plate 72, and a second metal mold 77 is attached to the movable die plate 75. A ball screw 78 extends through the rear plate 73 with an end (the left end as viewed in FIG. 14) of the ball screw 78 fixed to the movable die plate 75. A nut 79 is rotatably provided in the rear plate 73 and the ball screw 78 is threaded to the nut 79. A motor 80, which drives and rotates the nut 79, is fixed to the rear plate 73. Thus, when the motor 80 of the mold clamping mechanism 71 operates the nut 79 to rotate, the ball screw 78 axially moves relative to the rear plate 73. This axially moves the movable die plate 75, which is fixed to the ball screw 78, with the tie bars 74 guiding the movable die plate 75. In this manner, the second metal mold 77, which is attached to the movable die plate 75, selectively approaches and separates from the first metal mold 76. In molding of resin, the second metal mold 77 is brought into contact with the first metal mold 76 and then pressed against the first metal mold 76 through further movement of the ball screw 78.

Another type of mold clamping mechanism is described in Japanese Laid-Open Patent Publication No. 5-269748. Specifically, as shown in FIG. 15, a mold clamping mechanism 81 has a fixed die plate 83 to which a first metal mold 82 is attached. A ball screw 84 is rotatably supported by each of the four corners of the fixed die plate 83 through a bearing 85. A second metal mold 86 is attached to a movable die plate 87. A ball nut 88 is provided at each of the four corners of the movable die plate 87. The ball screws 84 are each threaded to the corresponding one of the ball nuts 88. A motor 90 is connected to the fixed die plate 83 through a bracket 89. The ball screws 84 are operably connected to an output shaft 91 of the motor 90 through couplings 92. Thus, when the motor 90 of the mold clamping mechanism 81 operates the ball screws 84 to rotate, the movable die plate 87 moves in the axial direction of the ball screws 84. This causes the second metal mold 86 to selectively approach and separate from the first metal mold 82, together with the movable die plate 87. In molding of resin, the second metal mold 86 is brought into contact with the first metal mold 82 and then pressed against the first metal mold 82 through further rotation of the ball screws 84.

[Patent Document 1] Japanese Laid-Open Patent Publication No. 5-269748

However, in order to press the second metal mold 77 against the first metal mold 76, the mold clamping mechanism 71 employs the fixed die plate 72, the movable die plate 75, and the tie bars 74, additionally to the first and second metal molds 76, 77. The first metal mold 76 is attached to the fixed die plate 72 and the second metal mold 77 is attached to the movable die plate 75. The positions of the ball screw 78 and the nut 79 are changed relative to each other to move the movable die plate 75 in such a manner that the second metal mold 77 is pressed against the first metal mold 76. In other words, the mold clamping mechanism 71 uses various components other than the direct targets of pressing, which are the first and second metal molds 76, 77, and thus becomes large-sized. Also, since the movable die plate 75, which is heavy, is moved to move the second metal mold 77, the motor 80 must be a large-sized type with great output torque. This further enlarges the size of the mold clamping mechanism 71.

Also, although the mold clamping mechanism 81 of Japanese Laid-Open Patent Publication No. 5-269748 does not include any tie bar, the mold clamping mechanism 81 employs the fixed die plate 83 and the movable die plate 87 additionally to the first metal mold 82 and the second metal mold 86. Accordingly, like the above-described case, the mold clamping mechanism 81 becomes disadvantageously large-sized.

SUMMARY OF THE INVENTION

Accordingly, it is an objective of the present invention to provide a small-sized mold clamping mechanism and a small-sized injection molding machine, compared to a case in which a die plate or a tie bar is employed.

To achieve the foregoing objective and in accordance with a first aspect of the present invention, a mold clamping mechanism used in an injection molding machine having a first metal mold and a second metal mold that selectively contacts and separates from the first metal mold is provided. In molding of resin, the mold clamping mechanism presses the second metal mold contacting the first metal mold against the first metal mold. The second metal mold has a through hole that extends in a movement direction of the second metal mold. The first metal mold has an internal threaded portion that extends on a common line with the through hole and has an opening at a side surface facing the second metal mold. The mechanism includes a bolt having a shaft and a head, and a drive mechanism that passes the shaft through the through hole in such a manner that the head of the bolt is arranged at the opposite side to the first metal mold with respect to the second metal mold and that a distal end of the shaft of the bolt is located at the same side as the first metal mold with respect to the second metal mold. With the second metal mold held in contact with the first metal mold, the drive mechanism rotates the bolt through the head in such a manner that the shaft is threaded to the internal threaded portion, thereby pressing the second metal mold against the first metal mold.

In this structure, the second metal mold is brought into contact with the first metal mold in molding of resin. In this state, the bolt, which is passed through the through hole of the second metal mold, is rotated through the head by the drive mechanism so that the distal end of the shaft of the bolt is threaded to the internal threaded portion of the first metal mold. This axially moves the shaft to produce axial force, thus pressing the second metal mold against the first metal mold. In this manner, mold clamping is accomplished.

After the formation of a molded product is completed, the drive mechanism operates to rotate the bolt through the head in the opposite direction to the direction of the above-described case, or the direction in which the bolt becomes loosened. This decreases the axial force and releases the first and second metal molds from the clamped state. That is, the distal end of the shaft of the bolt retreats from the internal threaded portion of the first metal mold, thus allowing movement of the second metal mold. The second metal mold is then separated from the first metal mold and the molded product is removed from the first and second metal molds.

As has been described, according to the first aspect of the present invention, the second metal mold is pressed directly against the first metal mold through rotation of the bolt in a direction in which the bolt becomes fastened. It is thus unnecessary to employ a die plate or a tie bar for mold clamping. Accordingly, the mold clamping mechanism becomes small-sized, compared to the case in which a die plate or a tie bar is used.

Also, through setting of the position of the bolt in correspondence with the shape of the cavity formed between the first metal mold and the second metal mold, an appropriate level of mold clamping force is obtained. This facilitates downsizing of the first metal mold and the second metal mold.

In accordance with a second aspect of the present invention, a mold clamping mechanism used in an injection molding machine having a first metal mold and a second metal mold that selectively contacts and separates from the first metal mold is provided. In molding of resin, the mold clamping mechanism presses the second metal mold contacting the first metal mold against the first metal mold. The second metal mold has a through hole that extends in a movement direction of the second metal mold. The mechanism includes a bolt formed by only a shaft. The shaft has a proximal end and a distal end. The mechanism also includes a nut threaded to the distal end of the shaft, and a drive mechanism that rotates the nut in a fastening direction to press the second metal mold against the first metal mold in a state where the shaft is passed through the through hole with the proximal and distal ends of the shaft exposed from the through hole, the proximal end of the shaft is fixed to the first metal mold, the nut is threaded to the distal end of the shaft, and the second metal mold is held in contact with the first metal mold.

In this structure, the second metal mold is brought into contact with the first metal mold in molding of resin. In this state, the bolt, the proximal end of which is fixed to the first metal mold, is passed through the through hole of the second metal mold. When the drive mechanism operates to rotate the nut threaded to the distal end of the bolt in the direction in which the nut becomes fastened, the bolt moves axially to produce axial force. This presses the second metal mold against the first metal mold, or accomplishes mold clamping.

After the formation of a molded product, the drive mechanism operates to rotate the nut in the opposite direction to the aforementioned direction, or the direction in which the nut becomes loosened. This decreases the axial force and releases the first and second metal molds from the clamped state, allowing movement of the second metal mold. The second metal mold is then separated from the first metal mold, and the molded product is removed from the first and second molds.

As has been described, according to the second aspect of the present invention, the second metal mold is pressed directly against the first metal mold through rotation of the nut in the fastening direction. It is thus unnecessary to provide a die plate or a tie bar for mold clamping. Accordingly, compared to the case in which the die plate or the tie bar is used, the mold clamping mechanism becomes small-sized.

BRIEF DESCRIPTION OF THE DRAWINGS

FIG. 2(a) is an enlarged cross-sectional view showing section A of FIG. 1;

FIG. 2(b) is a partial longitudinal cross-sectional view showing the interior of a hydraulic washer;

DETAILED DESCRIPTION OF THE PREFERRED EMBODIMENT

First Embodiment

A first embodiment of the present invention will now be described with reference to FIGS. 1 to 4.

Figure 1:
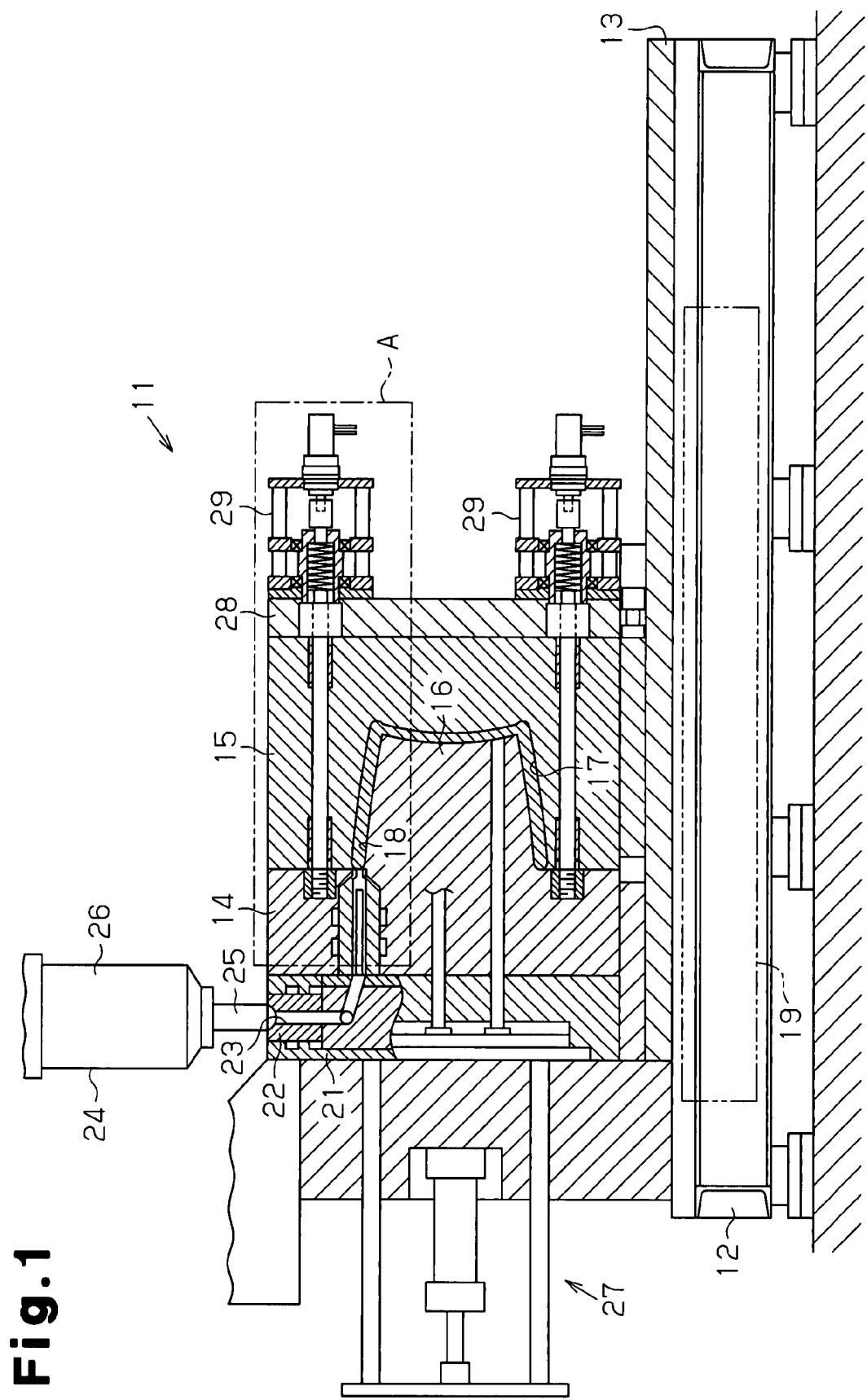
FIG. 1 is a partial longitudinal cross-sectional view showing an injection molding machine according to a first embodiment of the present invention with a portion of the machine omitted.

FIG. 1 shows a portion of an injection molding machine 11. FIG. 2(a) is an enlarged view showing section A of FIG. 1. As shown in FIGS. 1 and 2(a), a bushing 13 is provided on a base 12 of the injection molding machine 11 and a first metal mold 14 is fixed to the bushing 13. A second metal mold 15 is also mounted on the bushing 13 slidably in directions in which the second metal mold 15 selectively approaches and separates from the first metal mold 14 (in the left-and-right directions as viewed in FIG. 1). A molding projection 16 projects from the right side surface of the first metal mold 14. A molding recess 17 is defined in the left side surface of the second metal mold 15. When the second metal mold 15 contacts the first metal mold 14, the molding projection 16 is received in the molding recess 17. This defines a cavity 18, which is a space for forming a molded product P with a desired shape, between the molding projection 16 and the walls of the molding recess 17.

A hydraulic cylinder mechanism 19 is incorporated in a lower portion of the injection molding machine 11 and operates to slide the second metal mold 15 in the directions in which the second metal mold 15 selectively approaches and separates from the first metal mold 14.

A fixed platen 21 is arranged on the bushing 13 and at the side of the first metal mold 14 opposite to the second metal mold 15. A sprue bushing 22 is incorporated in an upper portion of the fixed platen 21. The sprue bushing 22 and the cavity 18 are connected to each other through a runner 23, which is provided in the fixed platen 21 and the first metal mold 14, in such a manner that the interior of the sprue bushing 22 and the cavity 18 communicate with each other.

A vertical injection device 24 is arranged at a position higher than the first metal mold 14 and the second metal mold 15, or, in the first embodiment, above the fixed platen 21. The injection device 24 has a heating cylinder 26 including a nozzle 25 extending from the lower end of the cylinder 26. A screw (not shown) is arranged in the heating cylinder 26. The injection device 24 retains molten resin material in a lower portion of the heating cylinder 26. As the screw proceeds, the molten resin is injected downward from the nozzle 25 at high pressure. The resin then passes through the sprue bushing 22 and the runner 23 and reaches the cavity 18.

In order to ensure sealing between the injection device 24 and the sprue bushing 22, the nozzle 25, which is formed at the lower end of the heating cylinder 26, is pressed against the sprue bushing 22 at high pressure. Thus, the fixed platen 21 and the first metal mold 14, which include the sprue bushing 22, are fixed to the base 12 with strength sufficiently great to receive the high pressure.

A projection mechanism 27 is arranged at the side (the left side as viewed in FIG. 1) of the fixed platen 21 opposite to the first metal mold 14. When the second metal mold 15 is separated from the first metal mold 14, or mold separation is carried out, the projection mechanism 27 projects the molded product P from the molding projection 16, with which the molded product P has been held in tight contact.

A movable plate 28 is detachably provided at the side (the right side as viewed in FIG. 1) of the second metal mold 15 opposite to the first metal mold 14. A plurality of pairs of mold clamping mechanisms 29 are attached to the movable plate 28. That is, although FIG. 1 shows only a pair of the mold clamping mechanisms 29 provided at upper and lower portions of the movable plate 28, multiple pairs of the mold clamping mechanisms 29 are arranged in a direction perpendicular to the sheet of the drawing. The mold clamping mechanisms 29 have an identical configuration.

In molding of resin, each of the mold clamping mechanisms 29 presses the second metal mold 15, which has been brought into contact with the first metal mold 14, against the first metal mold 14. In this manner, from when injection of molten resin is started to when the resin solidifies completely, the mold clamping mechanisms 29 continuously clamp the first metal mold 14 and the second metal mold 15 to prevent the second metal mold 15 from being separated from the first metal mold 14 by the pressure produced through the injection of resin.

The mold clamping mechanisms 29 will hereafter be explained. As illustrated in FIG. 2, a through hole 31 extends through the second metal mold 15 in the movement direction (the left-and-right direction as viewed in FIG. 1) of the second metal mold 15. The through hole 31 has openings 32 at both of the side surfaces of the second metal mold 15 in the movement direction of the second metal mold 15. A cylindrical guide member 33 is provided concentrically with the wall of the through hole 31 and at a position inward from and in the vicinity of each of the openings 32.

A cylindrical internal threaded portion 34 is provided in the first metal mold 14 and extends on the common line with the through hole 31. Specifically, a recess 35 is defined in the right side of the first metal mold 14. The internal threaded portion 34, which has internal threads 36 formed on the inner circumferential surface of the internal threaded portion 34, is fitted in the recess 35. The internal threaded portion 34 has an opening at the right side of the first metal mold 14.

Each mold clamping mechanism 29 includes a bolt 39 including a shaft 37 and a hexagonal head 38. The diameter of the shaft 37 is smaller than the diameter of the through hole 31. The length of the shaft 37 is greater than the length of the through hole 31. More specifically, the length of the shaft 37 is greater than the sum of the thickness of the second metal mold 15 and the thickness of the movable plate 28 (the length of the second metal mold 15 and the length of the movable plate 28 in the movement direction of the second metal mold 15). An external thread 41, which is threadable to the internal threads 36 of the internal threaded portion 34, is formed at the distal end of the shaft 37 (the end of the shaft 37 opposite to the head 38). The bolt 39 is arranged in the through hole 31 in such a manner as to satisfy the following conditions:

(i) The head 38 is arranged at the opposite side to the first metal mold 14 with respect to the second metal mold 15 (the right side of FIG. 2($a$)); and (ii) The distal end of the shaft 37 is located at the same side as the first metal mold 14 with respect to the second metal mold 15 (the left side of the drawing).

In the first embodiment, the position opposite to the second metal mold 15 with respect to the movable plate 28 (the position at the right side of FIG. 2($a$)) is set as the position satisfying the condition (i).

A most portion of the shaft 37 is passed through the through hole 31 of the second metal mold 15. Also, a portion of the shaft 37 is passed through the movable plate 28. Thus, when the bolt 39 is rotated to be fastened, the shaft 37 axially moves to produce axial force, which presses the second metal mold 15 against the first metal mold 14.

A drive mechanism 42, which operates to rotate the head 38 of the bolt 39, is arranged above the movable plate 28.

The drive mechanism 42 is configured as follows. A plurality of support pillars 43 are arranged at a plurality of positions of the movable plate 28 surrounding the head 38 and extend in the movement direction of the second metal mold 15. A securing plate 44 is attached to the distal ends (the right ends as viewed in FIG. 2($a$)) of the support pillars 43. An electric motor 45, which is formed by, for example, a servomotor, is attached to the securing plate 44 with an output shaft 46 of the electric motor 45 extending parallel with the movement direction of the second metal mold 15.

A lidded cylindrical body 48 with a hexagonal hole 47 is used to transmit rotation of the output shaft 46 of the electric motor 45 to the head 38 of the bolt 39. The cylindrical body 48 is engaged with the head 38 of the bolt 39 at the hole 47.

The cylindrical body 48 has an outer circumferential surface that forms a cylindrical shape. A plurality of (in the first embodiment, two) bearings 49 are attached to each of the support pillars 43 and spaced from each other at a predetermined interval in the movement direction of the second metal mold 15. The cylindrical body 48 is rotatably supported by the support pillars 43 through the bearings 49. The output shaft 46 of the electric motor 45 and the cylindrical body 48 are connected together through a coupling 51 in an integrally rotatable manner. The cylindrical body 48 and the coupling 51 form a rotation transmitting portion that transmits rotation of the output shaft 46 of the electric motor 45 to the head 38 of the bolt 39.

As an urging member, a coil spring 52 is arranged between the inner bottom surface of the hole 47 of the cylindrical body 48 and the head 38 of the bolt 39 in a compressed state. The coil spring 52 constantly urges the bolt 39 toward the internal threaded portion 34 in an elastic manner.

Further, in the first embodiment, a hydraulic washer 53 is provided between the second metal mold 15 and the head 38 of the bolt 39 as axial force generation assisting means, which generates axial force corresponding to the amount of extension of the shaft 37 caused by fastening of the bolt 39. With reference to FIG. 2(b), the hydraulic washer 53 is received in an accommodation bore 54 defined in the movable plate 28. The accommodation bore 54 is arranged on the common line with the through hole 31 of the second metal mold 15 and has a diameter greater than the diameter of the through hole 31.

The hydraulic washer 53 has a cylinder 55 and a piston 56. The cylinder 55 has an annular shape and is fixedly engaged with the accommodation bore 54. An annular recess 57 is defined in the cylinder 55 and has an opening at the right side surface of the recess 57. The piston 56 has an annular shape and is accommodated in the annular recess 57 in such a manner as to selectively project from and retreat into the cylinder 55. The space between the inner bottom surface of the annular recess 57 and the piston 56 forms a hydraulic chamber 58. A fluid passage 59 is defined in the movable plate 28 and the cylinder 55 in such a manner as to allow communication between the exterior of the movable plate 28 and the hydraulic chamber 58. When hydraulic fluid under high pressure is supplied from the exterior of the movable plate 28 to the hydraulic chamber 58 through the fluid passage 59, hydraulic pressure caused by the hydraulic fluid acts on the piston 56 to project the piston 56 from the cylinder 55. The piston 56 thus presses the head 38 of the bolt 39 with a great force.

Each of the mold clamping mechanisms 29 according to the first embodiment is configured as described above. Unlike conventional types, the mold clamping mechanisms 29 do not employ any die plate or tie bar, which operates to move a metal mold. To clamp the first and second metal molds 14, 15, each mold clamping mechanism 29 operates in the following manner.

Figure 3:
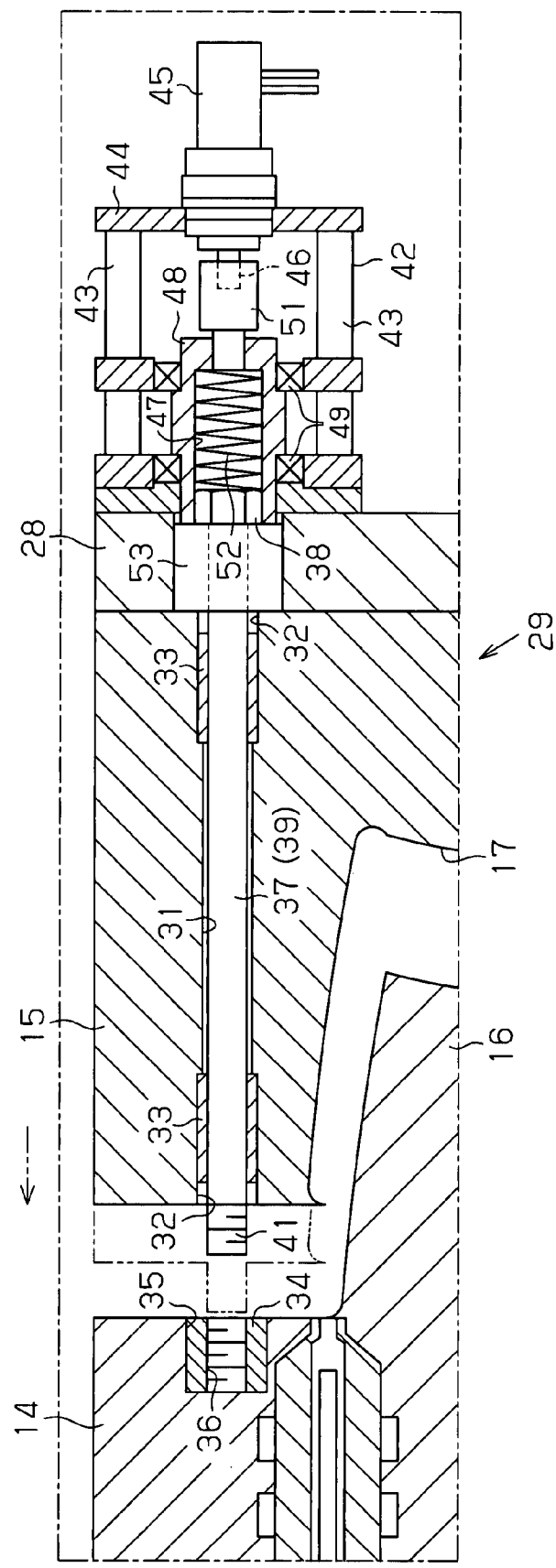
FIG. 3 is a partial longitudinal cross-sectional view in correspondence with FIG. 2(a), showing the mold clamping mechanism in a transitional state when a second metal mold approaches a first metal mold.

FIG. 3 shows the mold clamping mechanism 29 with the second metal mold 15 separated from the first metal mold 14. In this state, rotation of the output shaft 46 of the electric motor 45 is suspended. Supply of the hydraulic fluid to the hydraulic chamber 58 of the hydraulic washer 53 is also suspended, and the hydraulic pressure in the hydraulic chamber 58 is low. The head 38 of the bolt 39 is urged by the coil spring 52 to press the piston 56 of the hydraulic washer 53. This retracts the piston 56 into the cylinder 55. Further, the external thread 41 provided at the distal end of the shaft 37 of the bolt 39 is exposed from the through hole 31 toward the first metal mold 14 but spaced from the internal threaded portion 34 of the first metal mold 14.

In this state, if the hydraulic cylinder mechanism 19 is actuated to move the second metal mold 15 toward the first metal mold 14 (leftward as viewed in FIG. 3), the external thread 41 of the shaft 37, which is exposed from the second metal mold 15, also approaches the first metal mold 14. In such approaching, as indicated by the double-dotted chain lines in FIG. 3, the external thread 41 is brought into contact with the internal threaded portion 34. In this state, the second metal mold 15 remains separate from the first metal mold 14.

As the hydraulic cylinder mechanism 19 further operates to move the second metal mold 15 toward the first metal mold 14, further movement of the bolt 39 toward the first metal mold 14 is restricted in such a manner that the hydraulic washer 53 separates from the head 38 of the bolt 39. Since the cylindrical body 48 approaches the first metal mold 14 together with the second metal mold 15, the coil spring 52 between the head 38 of the bolt 39 and the inner bottom surface of the cylindrical body 48 is compressed.

Figure 4:
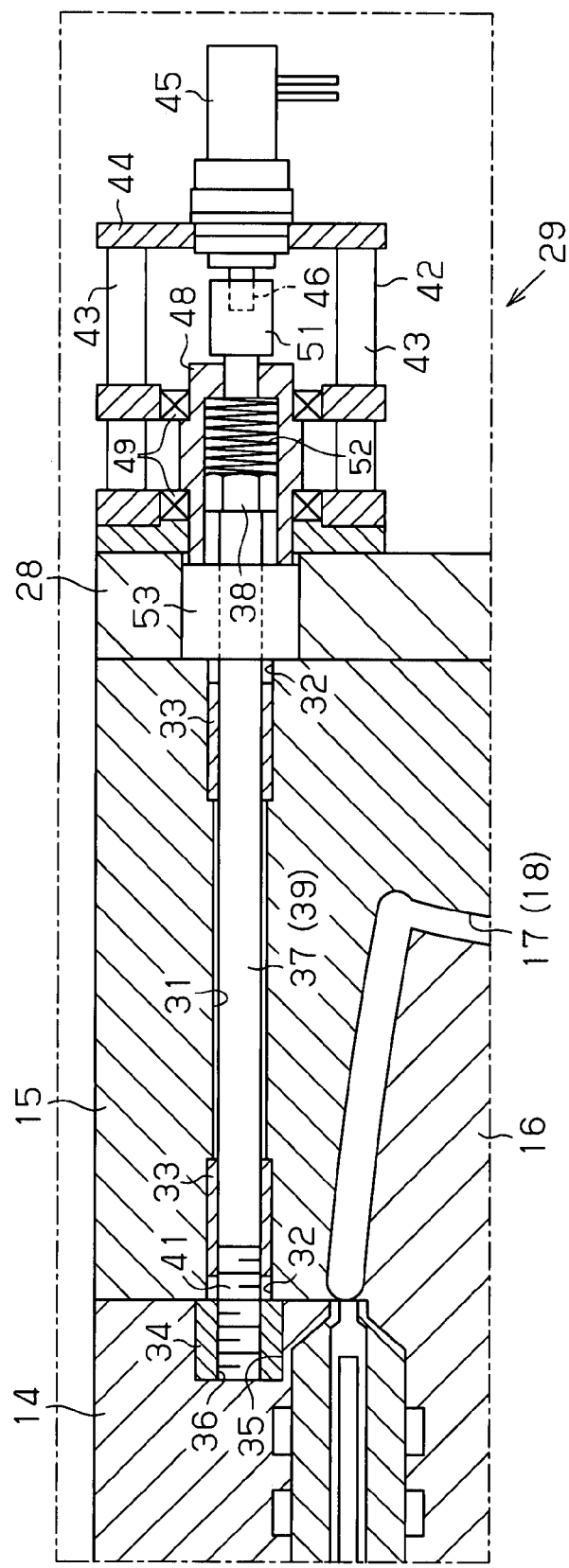
FIG. 4 is a partial longitudinal cross-sectional view in correspondence with FIG. 2(a), showing the mold clamping mechanism in a state in which a distal end of a bolt is retracted from an internal threaded portion.

As illustrated in FIG. 4, the hydraulic cylinder mechanism 19 is stopped once the second metal mold 15 contacts the first metal mold 14. In this state, the cavity 18 is defined between the first and second metal molds 14, 15. Then, the output shaft 46 of the electric motor 45 starts to rotate. Such rotation of the output shaft 46 is transmitted to the cylindrical body 48 through the coupling 51 so that the coil spring 52 is driven to rotate together with the cylindrical body 48. Through rotation of the cylindrical body 48, the head 38 of the bolt 39 is rotated. The shaft 37 of the bolt 39, which is elastically urged by the coil spring 52 in a compressed state, is pressed against the internal threaded portion 34. Thus, when the end of the external thread 41 of the shaft 37 agrees with the end of the internal threads 36 of the internal threaded portion 34, the external thread 41 becomes threaded to the internal threads 36 and threading of the shaft 37 with the internal threaded portion 34 is started.

As the output shaft 46 of the electric motor 45 continuously rotates, the bolt 39 also continuously rotates. This gradually causes the external thread 41 of the shaft 37 to be threaded to the internal threads 36 of the internal threaded portion 34. In this state, movement of the second metal mold 15 toward the first metal mold 14 is suspended. Thus, through such threading between the bolt 39 and the internal threads 36, the head 38 approaches the hydraulic washer 53. When the head 38 comes into contact with the hydraulic washer 53 as shown in FIG. 2(a), the output shaft 46 of the electric motor 45 is stopped from rotating. This stops rotation of the coupling 51 and the cylindrical body 48 in such a manner as to suspend rotation of the bolt 39. Threading of the shaft 37 to the internal threads 36 is also stopped. When the bolt 39 is fastened and thus clamps the second metal mold 15 between the hydraulic washer 53 and the first metal mold 14, the shaft 37 of the bolt 39 axially moves to produce axial force. At this stage, the shaft 37 remains substantially non-moved, and substantially no axial force has been produced.

The axial force necessary to allow the bolt 39 to press the second metal mold 15 against the first metal mold 14 is defined as required axial force. If the hydraulic washer 53 is not employed, the axial force corresponding to the required axial force must be produced solely through movement of the shaft 37 caused by fastening of the bolt 39.

However, in the first embodiment, the hydraulic fluid is supplied to the hydraulic chamber 58 of the hydraulic washer 53 through the fluid passage 59 at the above-described stage. This raises the hydraulic pressure in the hydraulic chamber 58 and such pressure is applied to the piston 56. The raised hydraulic pressure is maintained until the cavity 18 is filled with the molten resin and the resin cools down and solidifies. Referring to FIG. 2(b), the raised hydraulic pressure causes the piston 56 to project from the cylinder 55 and press the head 38 of the bolt 39 with great force. Although rotation of the bolt 39 is suspended in this state, such pressing by the piston 56 moves the shaft 37 to produce the axial force. The axial force, which is produced by the hydraulic washer 53, thus provides part of the required axial force. In other words, the difference between the axial force generated through rotation of the bolt 39 and the required axial force is compensated by the axial force produced by the hydraulic washer 53. In the first embodiment, although the magnitude of the axial force generated through rotation of the bolt 39 is small, the hydraulic washer 53 operates to produce the required axial force through the bolt 39. The second metal mold 15 is thus pressed against the first metal mold 14, or mold clamping is carried out.

Subsequently, the molten resin is injected from the nozzle 25 of the injection device 24 into the sprue bushing 22 (see FIG. 1). The resin then flows through the runner 23 and reaches the cavity 18 so that the cavity 18 becomes filled with the molten resin. In this state, the second metal mold 15 is pressed against the first metal mold 14 by the mold clamping mechanism 29. This prevents the pressure produced through injection of the molten resin from separating the second metal mold 15 from the first metal mold 14. As the molten resin cools down and solidifies, the molded product P with a desired shape is formed in the cavity 18.

After the formation of the molded product P, the mold clamping mechanism P operates in the manner opposite to the above-described operation. First, in the state of FIG. 2, the hydraulic fluid is drained from the hydraulic chamber 58 of the hydraulic washer 53 to decrease the hydraulic pressure in the hydraulic chamber 58. The piston 56 receives the urging force of the coil spring 52 through the head 38 of the bolt 39. This causes the head 38 to press and retract the piston 56 into the cylinder 55. Thus, the axial force produced by the hydraulic washer 53 decreases.

Next, the output shaft 46 of the electric motor 45 is rotated in the opposite direction to the above-described direction, or the direction in which the bolt 39 becomes loosened. The rotation of the output shaft 46 is transmitted to the bolt 39 through the coupling 51 and the cylindrical body 48 in such a manner that the bolt 39 retreats (toward the electric motor 45) against the coil spring 52. This reduces the axial force produced through rotation of the bolt 39, releasing the first and second metal molds 14, 15 from the clamped state. After the external thread 41 of the shaft 37 is separated from the internal threaded portion 34 through retreat of the bolt 39, as illustrated in FIG. 4, the second metal mold 15 is allowed to move. Such retreat of the bolt 39 also separates the head 38 of the bolt 39 from the piston 56 of the hydraulic washer 53.

Subsequently, the hydraulic cylinder mechanism 19 (see FIG. 1) operates to start movement of the second metal mold 15 separately (rightward as viewed in FIG. 4) from the first metal mold 14. Thus, the second metal mold 15 separates from the first metal mold 14, as indicated by the double-dotted chain lines in FIG. 3. In this state, since the head 38 of the bolt 39 is urged by the coil spring 52, the distal end of the shaft 37 is maintained in contact with the internal threaded portion 34. As the second metal mold 15 moves, the interval between the head 38 of the bolt 39 and the piston 56 of the hydraulic washer 53 decreases. After the piston 56 contacts the head 38, the bolt 39 moves integrally with the second metal mold 15 and thus separates from the internal threaded portion 34, as indicated by the solid lines in FIG. 3. Although not illustrated in FIG. 3, the molded product P separates from the molding recess 17 and tightly contacts the molding projection 16 of the first metal mold 14, when the second metal mold 15 separates from the first metal mold 14 in the above-described manner.

After the second metal mold 15 has separated from the first metal mold 14 by a predetermined distance, the projection mechanism 27 (see FIG. 1) operates to project the molded product P away from the molding projection 16. The molded product P is then removed from the first and second metal molds 14, 15.

The first embodiment has the following advantages.

(1) The second metal mold 15 has the through hole 31 that extends in the movement direction of the second metal mold 15. The first metal mold 14 has the internal threaded portion 34 that extends on the common line with the through hole 31 and has the opening facing the second metal mold 15. The shaft 37 of the bolt 39 is passed through the through hole 31 in such a manner that the head 38 is arranged at the opposite side to the first metal mold 14 with respect to the second metal mold 15, and the distal end of the shaft 37 is located at the same side as the first metal mold 14 with respect to the second metal mold 15. With the second metal mold 15 held in contact with the first metal mold 14, the electric motor 45 rotates the bolt 39 through the head 38 so that the distal end of the shaft 37 is threaded to the internal threads 36. In this manner, the second metal mold 15 is pressed against the first metal mold 14.

In this manner, through fastening of the bolt 39, the second metal mold 15 is pressed against the first metal mold 14. This makes it unnecessary to employ a die plate or a tie bar, which has been conventionally used in clamping of molds. Accordingly, the size of the mold clamping mechanism 29 is reduced.

Also, an appropriate level of mold clamping force is ensured through setting of the position of the bolt 39 in correspondence with the shape of the cavity 18, which is formed between the first and second metal molds 14, 15 when the second metal mold 15 is held in contact with the first metal mold 14. This facilitates downsizing of the first and second metal molds 14, 15.

Since the mold clamping mechanism 29 and the molds 14, are reduced in sizes, the injection molding machine 11 becomes also small.

(2) Since the internal threaded portion 34 has the opening facing the second metal mold 15, the bolt 39 is fastened in the vicinity of the cavity 18. This suppresses (flexible) deformation of the cavity 18 caused through fastening of the bolt 39. The shaping accuracy of the molded product P is thus improved.

Further, the axial force produced by the bolt 39 is efficiently applied to the first and second metal molds 14, 15. The required axial force of the bolt 39 is thus decreased.

(3) The hydraulic washer 53 is arranged between the second metal mold 15 and the head 38 of the bolt 39 and produces the axial force corresponding to the amount of extension of the shaft 37 caused by rotation of the bolt 39. Thus, part of the required axial force, which is necessary to press the second metal mold 15 against the first metal mold 14, is provided by the axial force produced by the hydraulic washer 53. This decreases the axial force that must be generated through movement of the bolt 39 caused by rotation of the bolt 39. Also, the small-sized electric motor 45 with small torque may be used as the electric motor that generates the decreased axial force through the bolt 39. The mold clamping mechanism 29 thus becomes further smaller in size.

(4) The coil spring 52 constantly urges the bolt 39 toward the internal threaded portion 34. This reliably causes the shaft 37 to be threaded into the internal threaded portion 34.

(5) The multiple mold clamping mechanisms 29 are attached to the movable plate 28, which is detachably attached to the second metal mold 15. The movable plate 28, to which the mold clamping mechanisms 29 are attached, is thus attached to the second metal mold 15 as a unit. Also, the internal threaded portion 34 is formed at a common position for a plurality of types of first metal molds 14. The through hole 31 is defined at a common position for a plurality of types of second metal molds 15. In this manner, the unit is mounted in any type of first metal mold 14 or second metal mold 15. That is, using the unit, clamping of multiple types of first metal molds 14 and multiple types of second metal molds 15 can be carried out.

(6) In the injection molding machine 11, the injection device 24 is arranged above the first metal mold 14 and the second metal mold 15. The molten resin is injected downward from the nozzle 25 of the injection device 24. Through such vertical arrangement of the injection device 24, the molten resin is reliably supplied to the cavity 18 without influencing the mold clamping by the mold clamping mechanisms 29.

Second Embodiment

Figure 5:
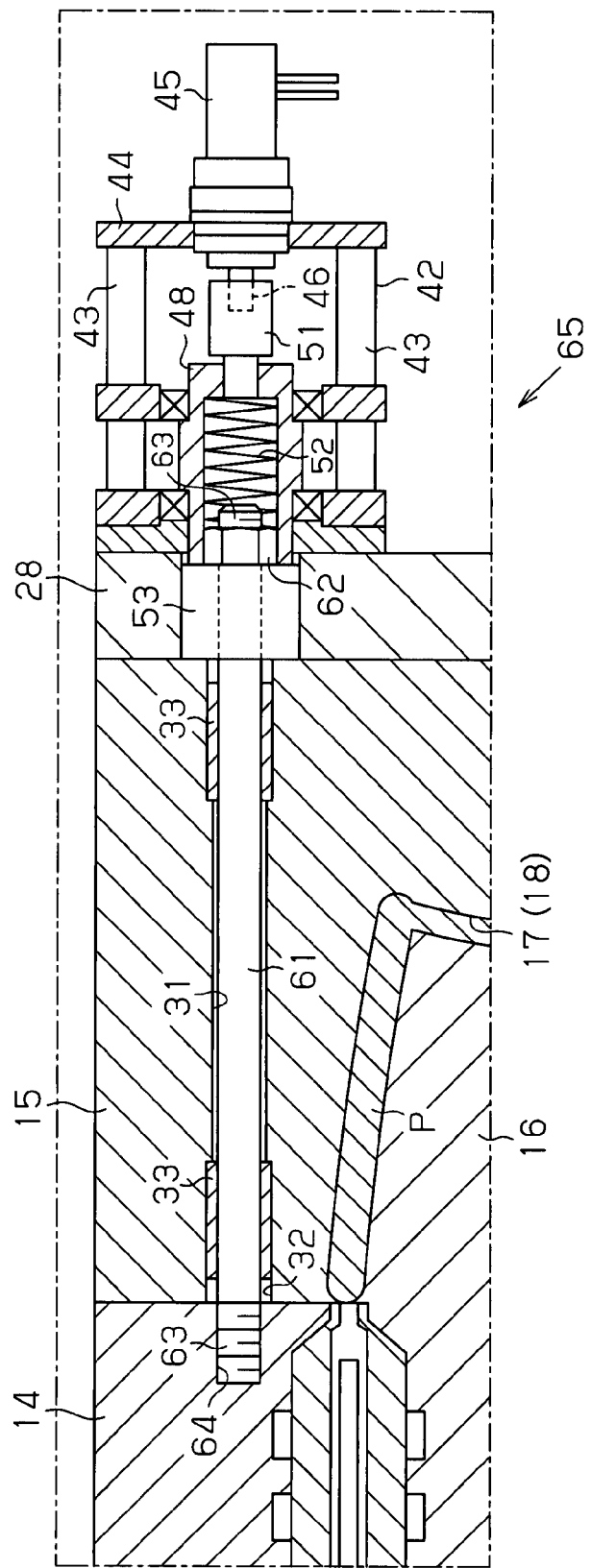
FIG. 5 is a partial longitudinal cross-sectional view, in correspondence with FIG. 2(a), showing a mold clamping mechanism of an injection molding machine according to a second embodiment of the present invention.

A second embodiment according to the present invention will hereafter be described with reference to FIG. 5.

The second embodiment is different from the first embodiment in that a stud bolt 61 and a nut 62 are used in combination instead of the bolt 39.

Specifically, the stud bolt 61 formed solely by a shaft is passed through the through hole 31 of the second metal mold 15, which extends in the movement direction of the second metal mold 15. The length of the stud bolt 61 is greater than the sum of the thickness of the second metal mold 15 and the thickness of the movable plate 28. An external thread 63 is formed at each of the two ends of the stud bolt 61. When the stud bolt 61 is passed through the through hole 31, the ends of the stud bolt 61 are exposed from the through hole 31. Particularly, the portion of the stud bolt 61 exposed from the through hole 31 toward the electric motor 45 (rightward as viewed in FIG. 5) is exposed also from the hydraulic washer 53 and received in the cylindrical body 48.

A threaded bore 64 is formed in the first metal mold 14 and extends on a common line with the through hole 31 and has an opening facing the second metal mold 15. The proximal end (the left end as viewed in FIG. 5) of the stud bolt 61, which is exposed from the through hole 31, is threaded to the threaded bore 64. This fixes the stud bolt 61 to the first metal mold 14. The stud bolt 61 may be fixed to the first metal mold 14 through means different from the aforementioned means.

The cylindrical body 48 accommodates the nut 62, instead of the head 38 of the bolt 39 of the first embodiment. The portion (the external thread 63) of the stud bolt 61 received in the cylindrical body 48 is threaded to the nut 62. The hydraulic washer 53, which is configured identically to that of the first embodiment, is provided between the second metal mold 15 and the nut 62 as axial force generation assisting means. As in the first embodiment, neither a die plate nor a tie bar is used in the second embodiment unlike the conventional arts.

The configurations of the other portions of the second embodiment are identical to the configurations of the corresponding portions of the first embodiment. Thus, same or like reference numerals are given to the portions of the second embodiment that are the same as or like the corresponding portions of the first embodiment and detailed description thereof is omitted.

In a mold clamping mechanisms 65 of the second embodiment, which is configured as described above, the electric motor 45 operates to rotate the nut 62 in the direction in which the nut 62 becomes fastened. This presses the second metal mold 15 against the first metal mold 14, thus accomplishing mold clamping.

Operation of the mold clamping mechanism 29 will be explained briefly. In molding of resin, the second metal mold 15 is brought into contact with the first metal mold 14 to form the cavity 18. In this state, the stud bolt 61 fixed to the first metal mold 14 is passed through the through hole 31 of the second metal mold 15. The nut 62, which is engaged with the corresponding end of the stud bolt 61, is rotated in the fastening direction by the electric motor 45.

After the nut 62 is slightly fastened, rotation of the nut 62 by the electric motor 45 is suspended and hydraulic fluid is supplied to the hydraulic chamber 58 of the hydraulic washer 53. This raises the hydraulic pressure in the hydraulic chamber 58 and projects the piston 56 from the cylinder 55, causing the piston 56 to press the nut 62. Although rotation of the nut 62 is suspended in this state, pressing by the piston 56 at the raised pressure moves the stud bolt 61 to produce axial force. The axial force produced by the hydraulic washer 53 thus provides part of the required axial force. In other words, the difference between the axial force produced through the rotation of the nut 62 and the required axial force is compensated by the axial force generated by the hydraulic washer 53. In the second embodiment, although the magnitude of the axial force produced through the rotation of the nut 62 is small, the required axial force is eventually produced by the stud bolt 61. The second metal mold 15 is thus pressed against the first metal mold 14, accomplishing the mold clamping.

In this manner, the second metal mold 15 is held in tight contact with the first metal mold 14 under high pressure. The molten resin is then injected into the cavity 18 so that the cavity 18 becomes filled with the resin. The molten resin is then cured to provide the molded product P with a desired shape.

After the molded product P is formed, the electric motor 45 is operated to rotate the nut 62 in the direction opposite to the above-described direction, or the direction in which the nut 62 becomes loosened. This releases the first and second metal molds 14, 15 from the clamped state to allow the second metal mold 15 to move. The second metal mold 15 is then separated from the first metal mold 14 and the molded product P is removed from the projection mechanism 27.

As has been described, also in the second embodiment, the second metal mold 15 is pressed directly against the first metal mold 14 through rotation of the nut 62 in the fastening direction. Thus, like the first embodiment, the second embodiment also has the above-described advantages of items (1) to (6).

Third Embodiment

A third embodiment of the present invention will now be described with reference to FIGS. 6 to 13.

Figure 6:
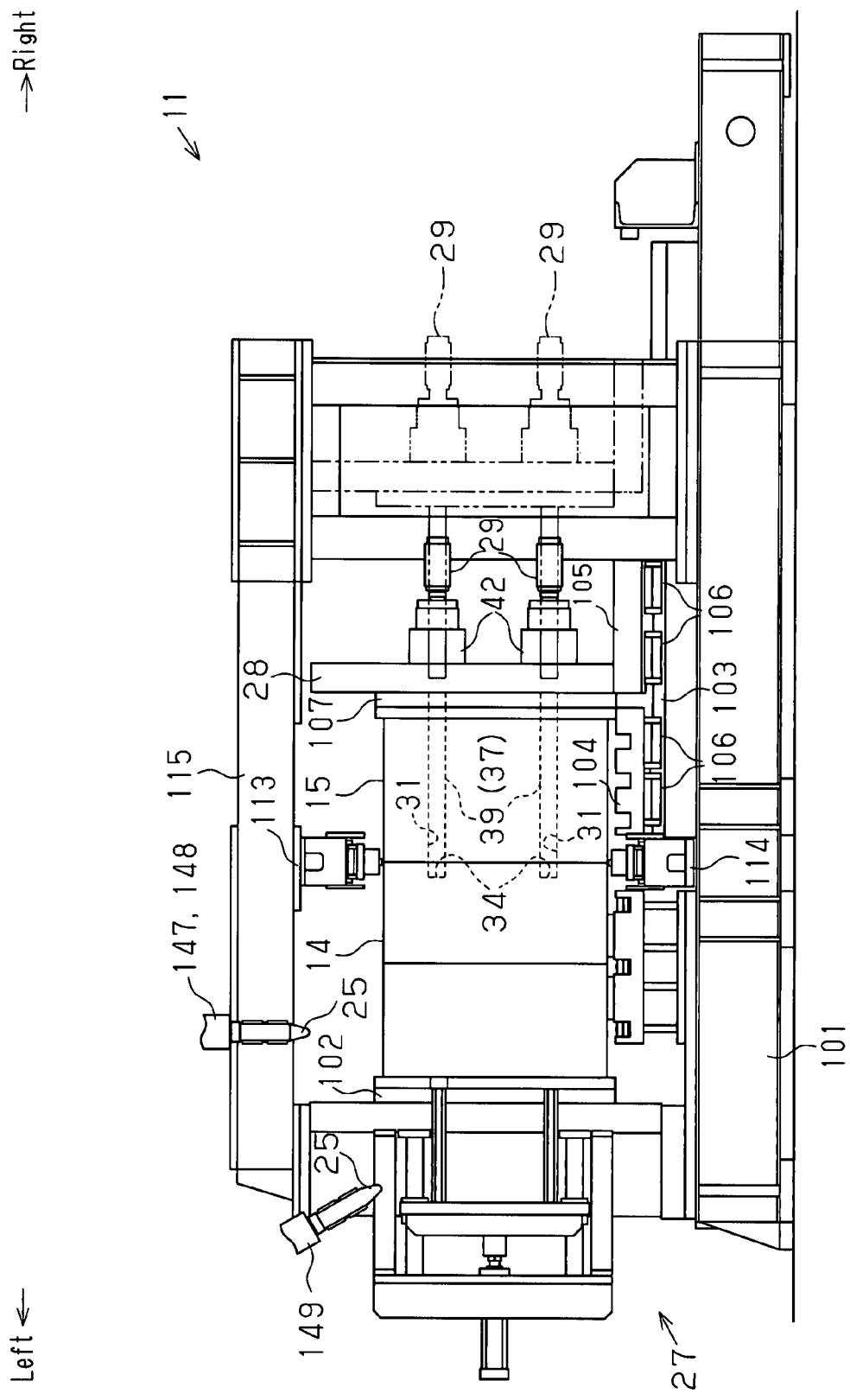
FIG. 6 is a front view showing an injection molding machine according to a third embodiment of the present invention.
Figure 7:
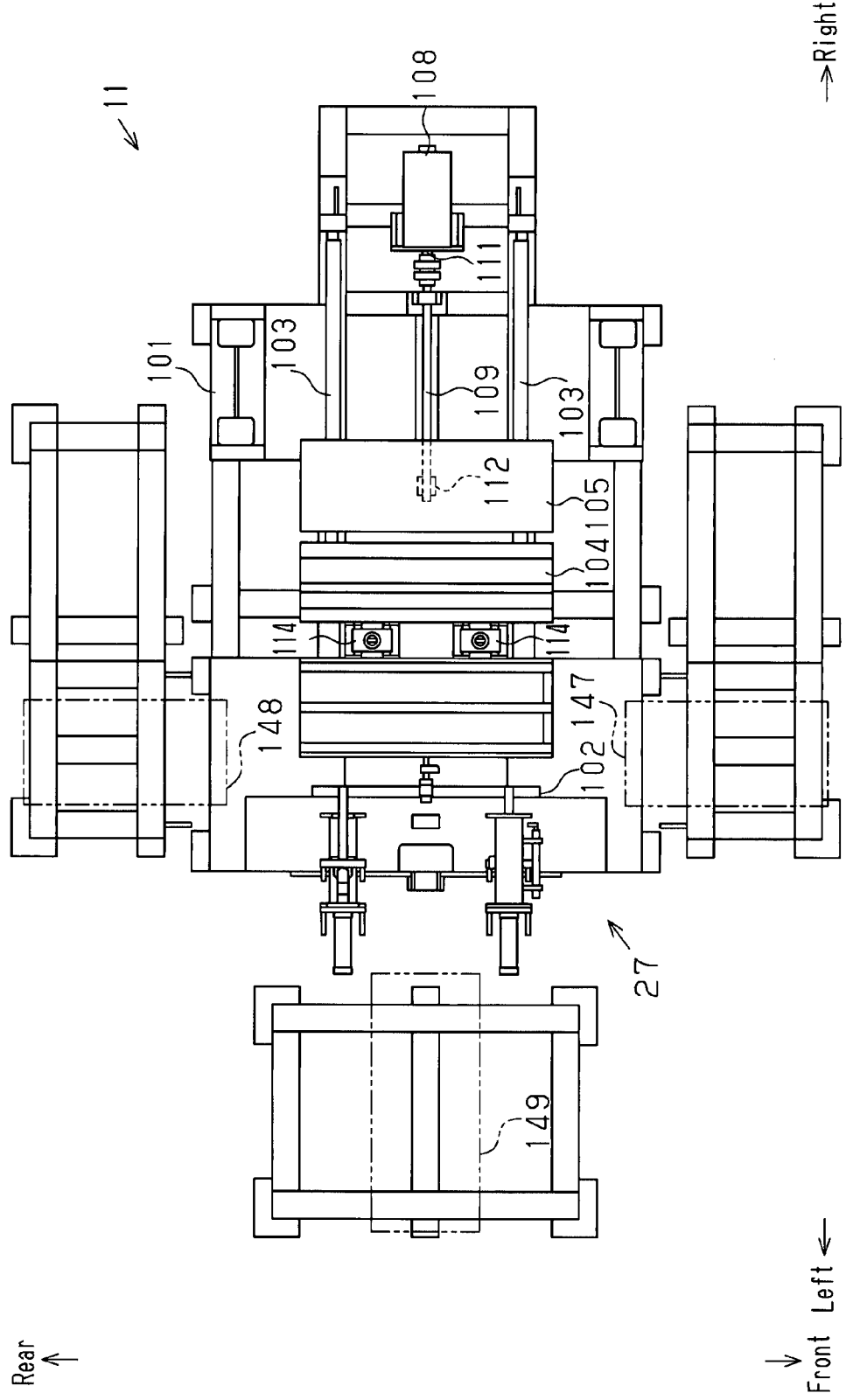
FIG. 7 is a plan view showing the injection molding machine shown in FIG. 6.
Figure 8:
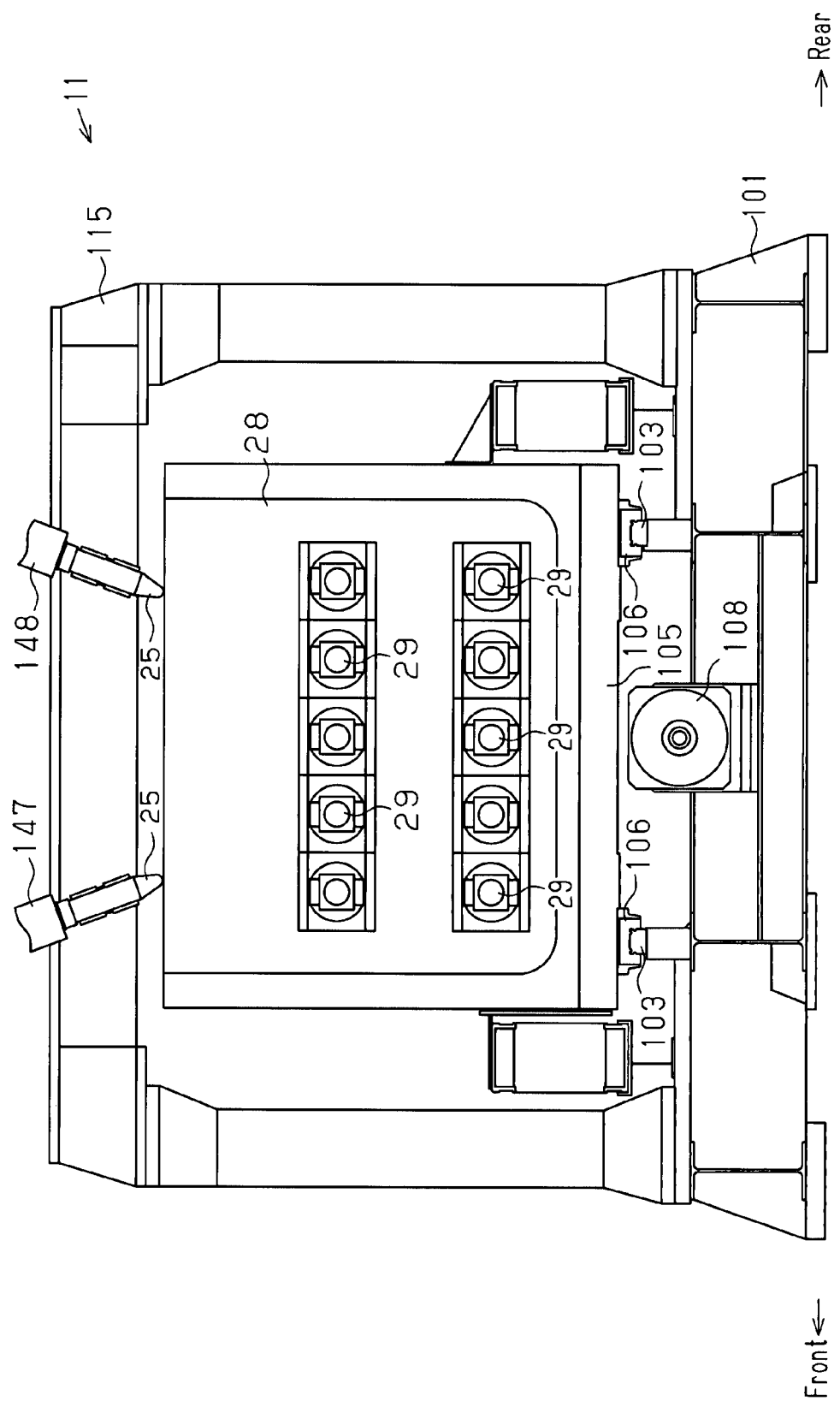
FIG. 8 is a right side view showing the injection molding machine shown in FIG. 6.

FIGS. 6, 7, and 8 are a front view, a plan view, and a right side view, respectively, showing the injection molding machine 11. FIG. 7 shows the injection molding machine 11 from which the first and second metal molds 14, 15 and the movable plate 28 have been removed.

As shown in FIGS. 6 to 8, the first metal mold 14 is arranged above a lower frame portion 101 of the injection molding machine 11. The projection mechanism 27 is located on the lower frame portion 101 and in the vicinity of the first metal mold 14 with a first mold holding portion 102 in between. The first mold holding portion 102 applies magnetic force to the first metal mold 14 to fixedly attract the first metal mold 14. For example, a magnetic attracting and holding device described in Japanese Patent No. 3898565 may be used as the first mold holding portion 102. The first mold holding portion 102 has a plurality of permanent magnets arranged around a plurality of block members, a plurality of AlNiCo magnets, and a plurality of coils wound around the corresponding AlNiCo magnets.

To attract and hold the first metal mold 14 at a metal mold attracting surface of the first mold holding portion 102, the first mold holding portion 102, which is configured as described above, energize the coils with a current in a predetermined direction for a few seconds. This changes the magnetic poles of the AlNiCo magnets in such a manner that, in each of the block members, the direction of the magnetic flux in the corresponding one of the AlNiCo magnets becomes the same as the direction of the magnetic flux of the associated one of the permanent magnets. In this manner, a magnetic flux passes between the first metal mold 14 and the first mold holding portion 102 and the first metal mold 14 is attracted and held by the mold attracting surface of the first mold holding portion 102.

To release the first metal mold 14 from the attracted and held state, the coils are energized in the opposite direction to the aforementioned direction for a few seconds. This inverts the magnetic poles of each AlNiCO magnet in such a manner that, in each block member, the magnetic flux produced by the corresponding AlNiCo magnet is prevented from flowing beyond the mold attracting surface. In this state, flow of the magnetic flux flows is restricted to the inside of the first mold holding portion 102. This releases the first metal mold 14 from the magnetic force, thus disengaging the first metal mold 14 from the first mold holding portion 102.

A pair of rails 103, 103 are fixed at two positions of the lower frame portion 101 that are spaced from each other in the forward-rearward direction. Each of the rails 103 extend in the movement direction (the left-and-right direction as viewed in FIG. 6) of the second metal mold 15. Two sliding members 104, 105 are slidably arranged on the rails 103, 103. Specifically, blocks 106, 106 are fixed at positions of the bottom surface of each of the sliding members 104, 105 that are spaced from each other in the forward-rearward direction. The blocks 106, 106 are slidably engaged with the corresponding one of the rails 103, 103. The second metal mold 15 is mounted on one of the sliding members (located leftward as viewed in FIG. 6), or the sliding member 104. The movable plate 28 is fixed to the other sliding member (located rightward in the drawing), or the sliding member 105 in an upright state.

A second mold holding portion 107 is arranged at the left side of the movable plate 28. The second mold holding portion 107 is configured identically to the first mold holding portion 102. The second mold holding portion 107 energizes the coils in a predetermined direction for a few seconds in such a manner that the direction of the magnetic flux of each AlNiCo magnet becomes the same as the direction of the magnetic flux generated by the corresponding permanent magnet. In this manner, a magnetic flux passes between the second metal mold 15 and the second mold holding portion 107 to attract and hold the second metal mold 15 by a mold attracting surface of the second mold holding portion 107. Further, by energizing the coils with a current in the opposite direction to the aforementioned direction for a few seconds, the second mold holding portion 107 inverses the magnetic poles of each AlNiCo magnet in such a manner that the magnetic flux produced by the AlNiCo magnet does not flow beyond the mold attracting surface. This restricts flow of the magnetic flux of the AlNiCo magnet to the inside of the second mold holding portion 107. The second metal mold 15 is thus released from the attracted and held state.

An electric motor 108 is arranged in the lower frame portion 101. A screw shaft 109 is provided between and rotatably supported by the sliding member 105 and the electric motor 108. An output shaft 111 of the electric motor 108 is connected to the screw shaft 109 in a power transmissible manner. A nut 112 is fixed to the bottom surface of the sliding member 105 and the screw shaft 109 is threaded to the nut 112. The screw shaft 109 and the nut 112 form a feed screw that converts rotation of the output shaft 111 of the electric motor 108 into linear movement of the sliding member 105 (the movable plate 28).

A plurality of mold clamping mechanisms 29 are attached to the movable plate 28 (see FIGS. 6 and 8). Specifically, the mold clamping mechanisms 29 include a group of (in the third embodiment, five) mold clamping mechanisms 29 that are arranged in an upper portion of the movable plate 28 and mutually spaced in the forward-rearward direction. The mold clamping mechanisms 29 also include a group of (in the third embodiment, five) mold clamping mechanisms 29 that are arranged in a lower portion of the movable plate 28 and mutually spaced in the forward-rearward direction. Each of the mold clamping mechanisms 29 is configured identically to that of the first embodiment.

Further, the third embodiment includes a plurality of mold separating mechanisms that separate the second metal mold 15 from the first metal mold 14. The mold separating mechanisms include a pair of upper mold separating mechanisms 113, 113 and a pair of lower mold separating mechanisms 114, 114. The upper mold separating mechanisms 113, 113 are fixed to an upper frame portion 115 of the injection molding machine 11 at positions spaced from each other in the forward-rearward direction and located above and in the vicinity of the mold alignment surfaces of the first metal mold 14 and the second metal mold 15. The lower mold separating mechanisms 114, 114 are fixed to a lower frame portion 101 of the injection molding machine 11 at positions spaced from each other in the forward-rearward direction and located below and in the vicinity of the mold alignment surfaces of the first metal mold 14 and the second metal mold 15 (see FIG. 7).

Each of the upper mold separating mechanisms 113 and each of the lower mold separating mechanisms 114 are basically configured identically to each other, except that the components of each upper mold separating mechanism 113 are arranged in vertically symmetrical positions with the corresponding components of the associated lower mold separating mechanism 114 as viewed in the vertical direction. Thus, in the following, only the lower mold separating mechanisms 114 will be explained by way of example.

Figure 9:
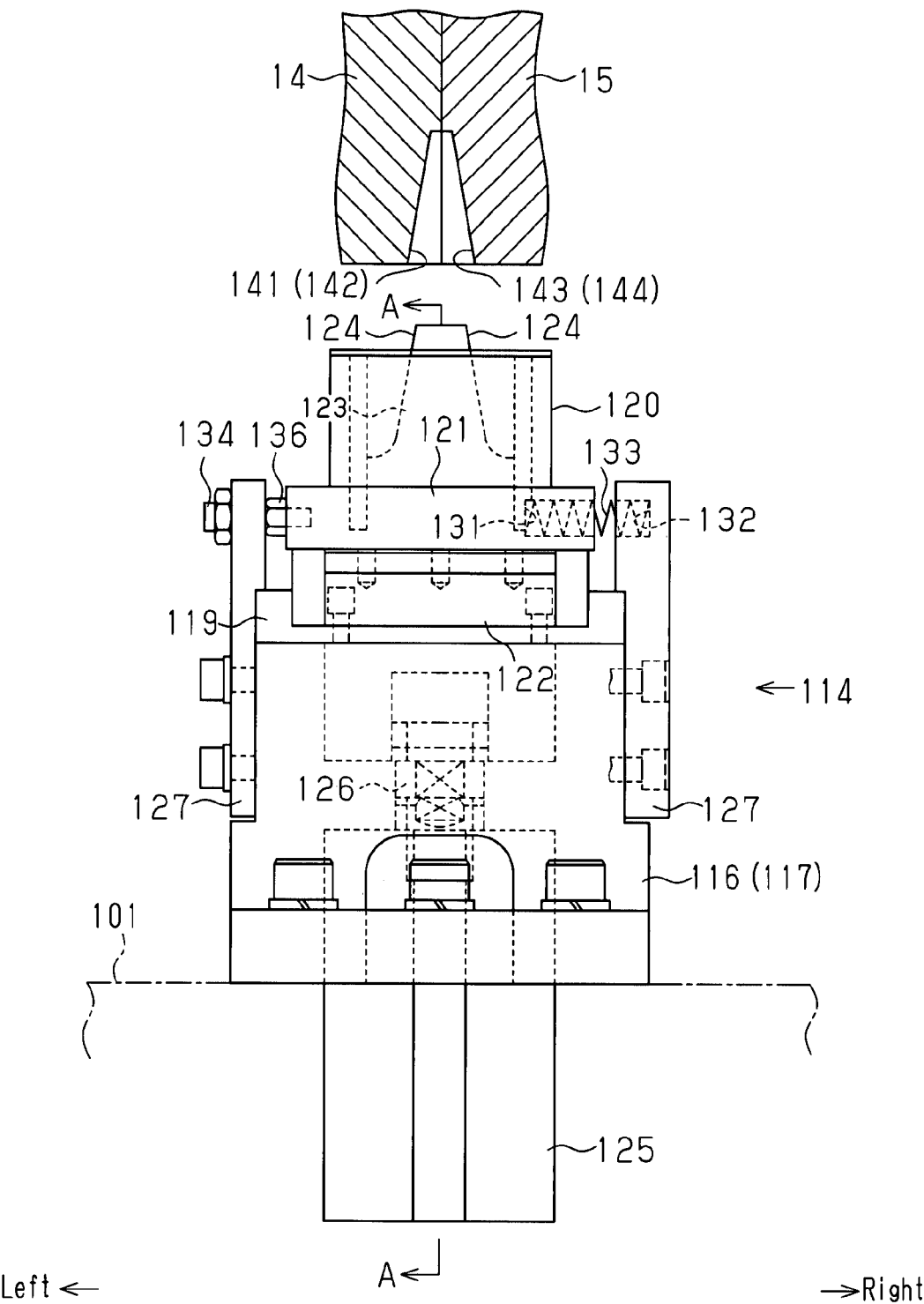
FIG. 9 is a front view showing a lower mold separating mechanism.
Figure 10:
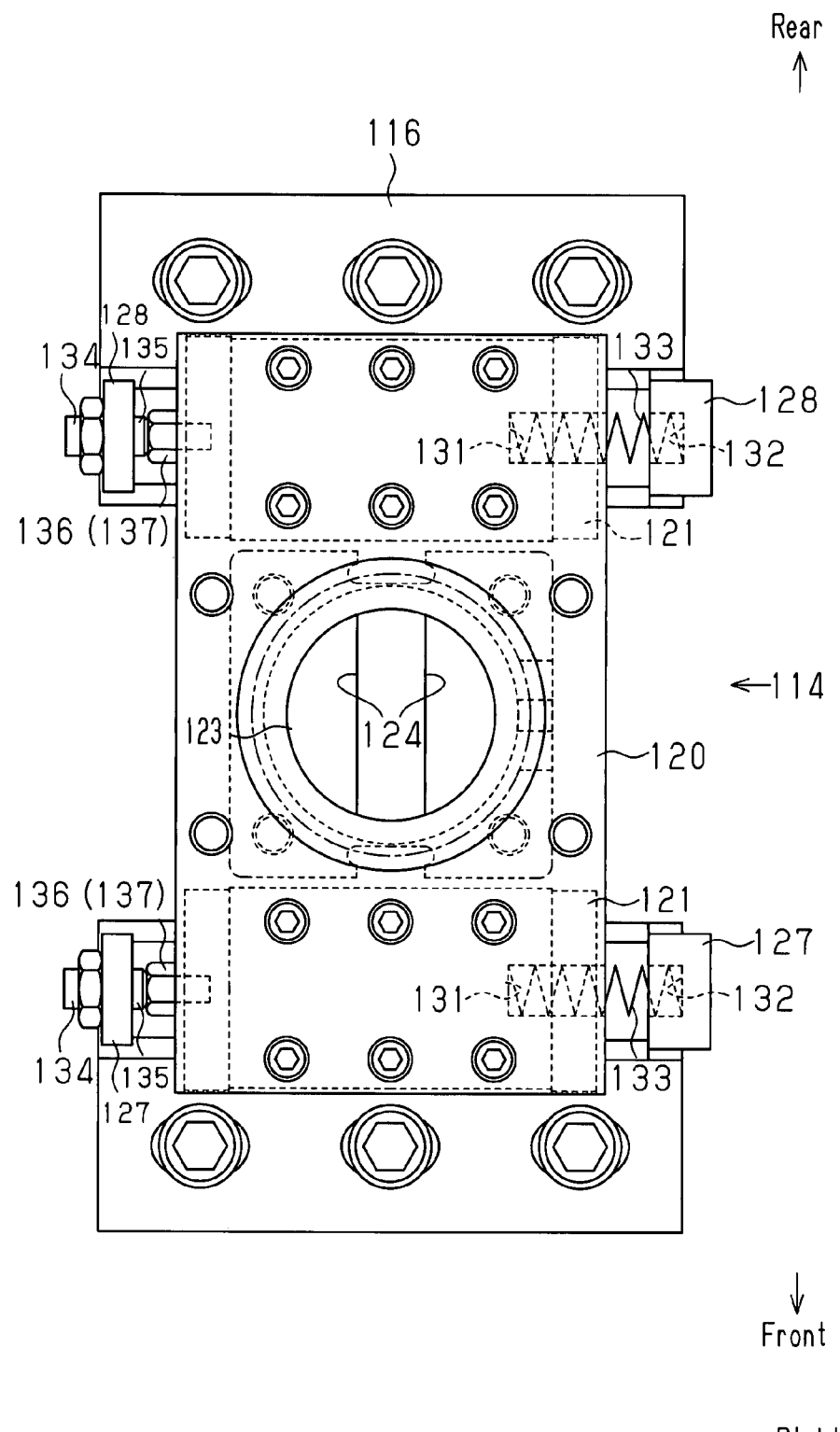
FIG. 10 is a plan view showing the mold separating mechanism shown in FIG. 9.
Figure 11:
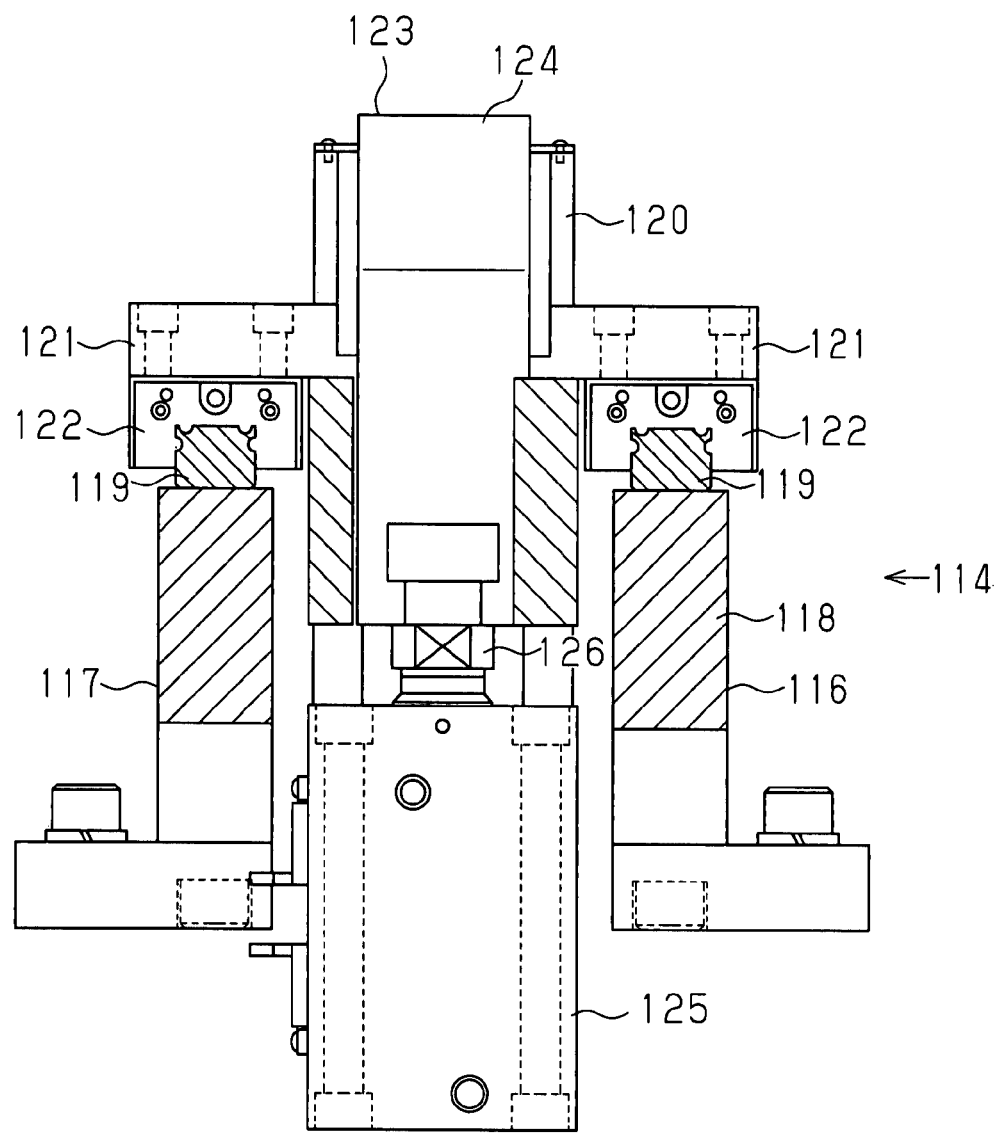
FIG. 11 is a cross-sectional view taken along line A-A of FIG. 9.

FIGS. 9 and 10 are a front view and a plan view, respectively, showing the mold separating mechanism 114. FIG. 11 is a cross-sectional view taken along line A-A of FIG. 9. As shown in FIGS. 9 to 11, the mold separating mechanism 114 is fixed to the lower frame portion 101 of the housing 116. The housing 116 has a pair of upright walls 117, 118, which are spaced from each other in the forward-rearward direction. A rail 119 is arranged on each of the walls 117, 118 and extends in the movement direction (the left-and-right direction of FIG. 9) of the second metal mold 15. A movable cylinder 120, which is shaped like a tube having upper and lower open ends, is arranged between the walls 117, 118 in a manner movable in the movement direction of the second metal mold 15. Specifically, flanges 121, 121, which extend frontward and rearward, are provided around the movable cylinder 120. A block 122 is fixed to the bottom surface of each of the flanges 121. Each of the blocks 122 is slidably engaged with the corresponding one of the rails 119.

The movable cylinder 120 slidably accommodates a substantially columnar mold separating member 123. A distal portion (an upper portion) of the mold separating member 123 is shaped in a wedge-like manner and has a thickness in the left-and-right direction that becomes gradually smaller upward. Thus, the left and right side surfaces of the distal portion of the mold separating member 123 form sloped surfaces 124, which are slanted with respect to a vertical plane.

A hydraulic cylinder 125, which linearly reciprocates a plunger 126 (or a piston) through hydraulic pressure, is arranged below the mold separating member 123 as an actuator that drives the mold separating member 123 to move in the vertical direction. The mold separating member 123 is connected to the distal end (the upper end) of the plunger 126 of the hydraulic cylinder 125 movably in the movement direction of the second metal mold 15.

Side plates 127, 127 are fixed to the opposite sides of the front wall 117 and side plates 128, 128 are fixed to the opposite sides of the rear wall 118. A recess 131 is defined in a side portion (a right portion as viewed in FIGS. 9 and 10) of each of the front and rear flanges 121, 121. A recess 132 is defined in an upper portion of each of the side plates 127, 128 located at one side (the right side as viewed in FIGS. 9 and 10), to be opposed to the corresponding recess 131. In other words, there are two pairs of opposed recesses 131, 132. A spring 133 is arranged between the bottom surfaces of each pair of the opposed recesses 131, 132 in a compressed state. The spring 133 constantly urges the movable cylinder 120 leftward.

Initial position adjustment bolts 134, 136 are attached to the movable cylinder 120 and each of the side plates 127, 128 located at the other side (the left side as viewed in FIGS. 9 and 10). The movable cylinder 120, which is urged by the spring 133, is maintained in a stationary state at an initial position through contact between a head 137 of the bolt 136 and a shaft 135 of the bolt 134. The initial position refers to a position corresponding to recesses 141, 143 of the first and second metal molds 14, 15, which will be explained later. More accurately, the initial position refers to a position at which the distal end of the mold separating member 123 contacts the walls of the recesses 141, 143 when the mold separating member 123 projects from the movable cylinder 120.

The recesses 141 are defined in the boundary between the lower surface and the corresponding side surface of the first metal mold 14 at two positions spaced from each other in the forward-rearward direction. Similarly, the recesses 143 are defined in the boundary between the lower surface and the corresponding side surface of the second metal mold 15 at two positions spaced from each other in the forward-rearward direction. Each of the recesses 141, which oppose the corresponding recesses 143, has a sloped surface 142 and has a depth that becomes gradually smaller in an upward direction. Each of the recesses 143, which oppose the corresponding recesses 141, has a sloped surface 144 and has a depth that becomes gradually smaller in an upward direction.

Further, the boundary between the upper surface and the corresponding side surface of the first metal mold 14 has recesses that are vertically symmetrical with the recesses 141. The boundary between the upper surface and the corresponding side surface of the second metal mold 15 has recesses that are vertically symmetrical with the recesses 143.

In the third embodiment, with reference to FIGS. 6 to 8, a plurality of (in the drawings, three) injection devices 147, 148, 149, which are arranged at positions higher than the first metal mold 14, are employed as injection devices. This shortens the passage in the cavity 18 through which the molten resin is supplied from the nozzles 25, which is the passage of the molten resin from the nozzles 25 to the cavity 18. In this manner, the injection pressure of each of the injection devices 147 to 149 is decreased.

The configurations of the other portions of the third embodiment are identical to the configurations of the corresponding portions of the first embodiment. Thus, same or like reference numerals are given to the portions of the third embodiment that are the same as or like the corresponding portions of the first embodiment and detailed description thereof is omitted.

The injection molding machine 11 of the third embodiment is configured as described above. In the injection molding machine 11, the mold clamping mechanisms 29 press the second metal mold 15 against the first metal mold 14 with extremely great mold clamping force. In separation of the first and second metal molds 14, 15, great force (approximately one tenth of the mold clamping force) is required initially (until the interval between the first metal mold 14 and the second metal mold 15 becomes approximately 5 to 10 mm), although the force is not as great as the mold clamping force. The reasons why such great force is necessary for separating the metal molds 14, 15 are as follows:

(I) In mold clamping, to prevent the molten resin from flowing into the portions other than the cavity 18, or the space between the first metal mold 14 and the second metal mold 15, the second metal mold 15 is deformed when being brought into tight contact with the first metal mold 14. Thus, to separate the first and second metal molds 14, 15, the second metal mold 15 must be deformed while being moved away from the first metal mold 14, which requires the aforementioned great force; and (II) The second metal mold 15 is exposed to the synthetic resin (the molded product P) that has been supplied to the cavity 18 and cooled and solidified in the cavity 18. Thus, at the initial stage of separation of the first and second metal molds 14, 15, great force is needed to separate the second metal mold 15 from the molded product P.

However, it is difficult for the mold clamping mechanisms 29 to produce the above-described great force necessary for separating the first and second metal molds 14, 15. Specifically, the force produced by the mold clamping mechanisms 29 becomes sufficient for moving the second metal mold 15 away from the first metal mold 14 only after the interval between the first metal mold 14 and the second metal mold 15 reaches the aforementioned value (5 to 10 mm).

To solve this problem, in the third embodiment, the multiple mold separating mechanisms 113, 114 are provided separately from the mold clamping mechanisms 29. That is, the mold separating mechanisms 113, 114 produce the above-described great force at the initial stage of separation of the first and second metal molds 14, 15. The second metal mold 15 thus can be separated from the first metal mold 14.

Figure 12:
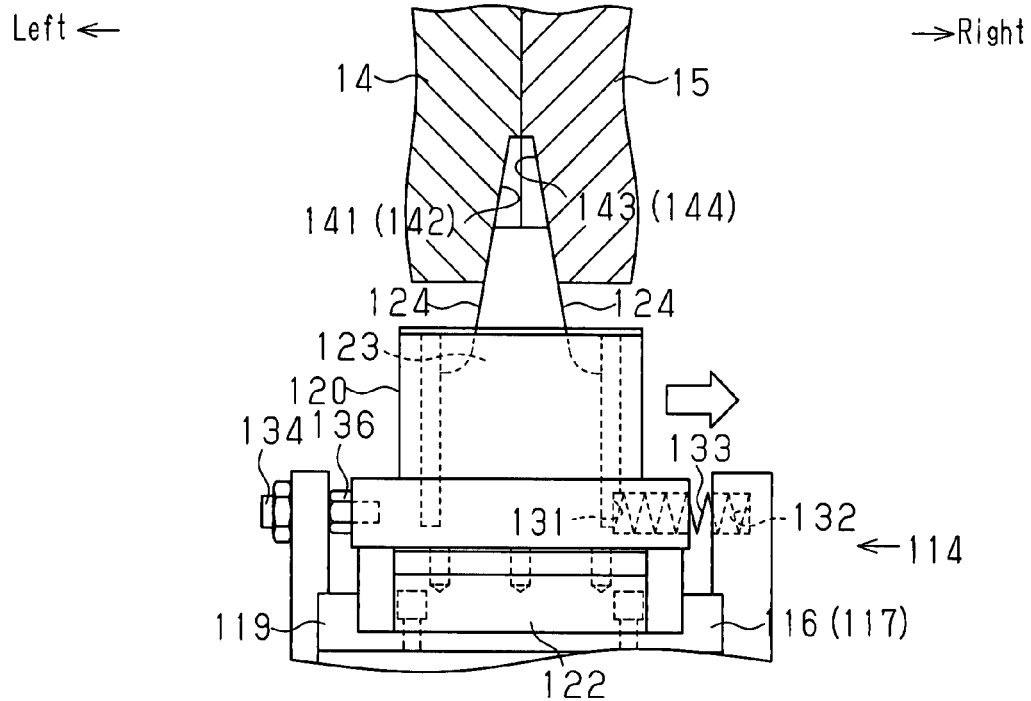
FIG. 12 is a partial front view for explaining the operation of the mold separating mechanism for separating the second metal mold from the first metal mold.
Figure 13:
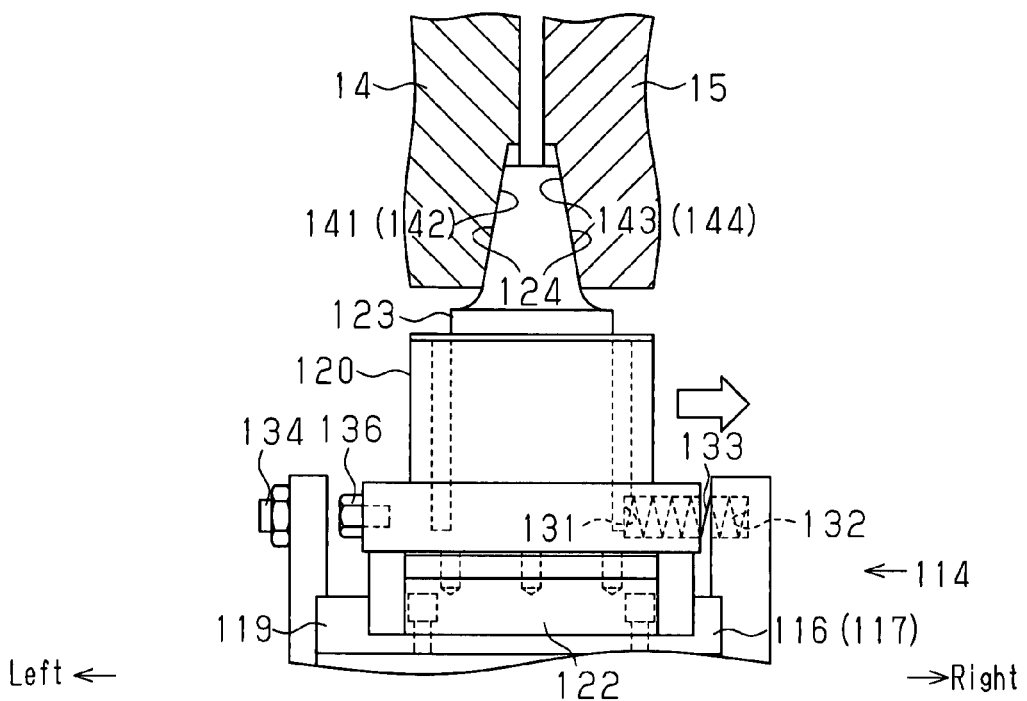
FIG. 13 is a partial front view for explaining the operation of the mold separating mechanism for separating the second metal mold from the first metal mold.
Figure 14:
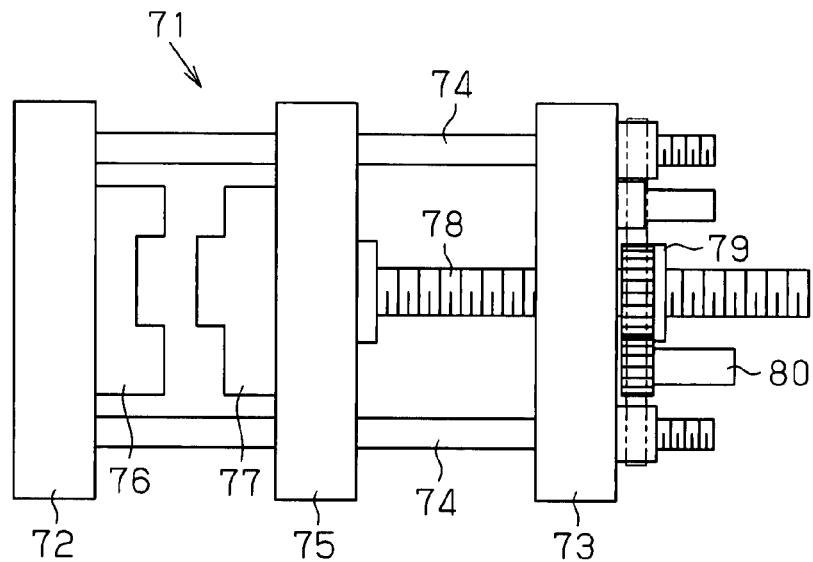
FIG. 14 is a front view showing a conventional mold clamping mechanism.
Figure 15:
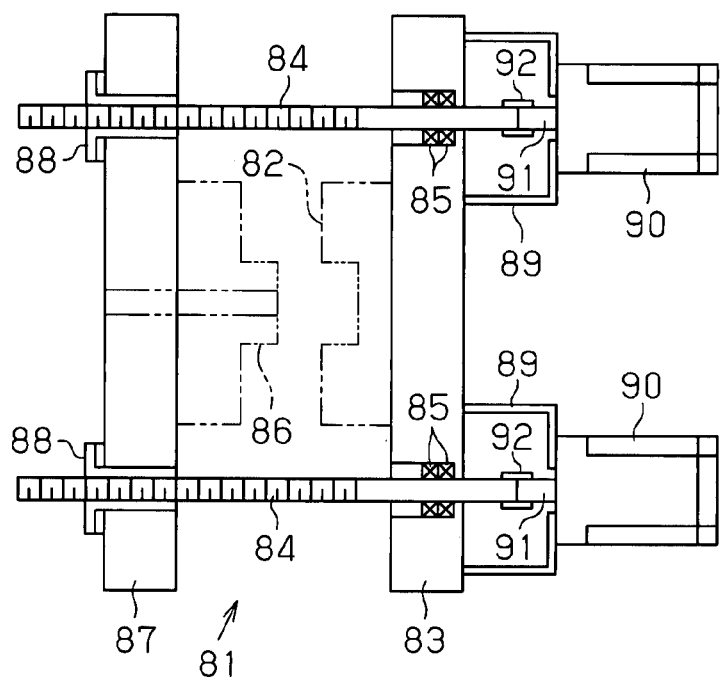
FIG. 15 is a cross-sectional view showing another type of conventional mold clamping mechanism.

Specifically, when the first and second metal molds 14, are separated from each other by the mold separating mechanisms 113, 114, the mold separating member 123 is projected from the movable cylinder 120 by the hydraulic cylinder 125 in each of the mold separating mechanisms 113, 114. Once the distal ends of all the mold separating members 123 of the mold separating mechanisms 113, 114 come into contact with the sloped surfaces 142, 144 of the recesses 141, 143 of the first and second metal molds 14, 15 as illustrated in FIG. 12, projection of the mold separating member 123 by the hydraulic cylinder 125 is suspended. This holds the mold separating members 123 of all the mold separating mechanisms 113, 114 in contact with the walls of the recesses 141, 143.

In this state, the output shaft 46 of each of the electric motors 45 is rotated in the direction in which the bolts 39 become loosened, in such a manner that each of the bolts 39 retreats (toward the electric motor 45) against the coil spring 52. This reduces the axial force generated through rotation of the bolts 39, thus releasing the first and second metal molds 14, 15 from the clamped state. When the external threads 41 of the shafts 37 are disengaged from the internal threaded portions 34 as the bolts 39 retreat, the mold separating members 123 of all the mold separating mechanisms 113, 114 are simultaneously projected from the movable cylinders 120 by the associated hydraulic cylinders 125. This causes the distal end of each of the mold separating members 123 to be received further deeply in the corresponding recesses 141, 143. The distal end of each mold separating member 123 has the wedge-like shape and the recesses 141, 143 have the sloped surfaces 142, 144 corresponding to the distal end of the mold separating member 123. Thus, as the mold separating member 123 is received deeply in the recesses 141, 143, force that is several times greater than the force produced by the hydraulic cylinder 125 to raise the mold separating member 123 is generated on the sloped surfaces 142, 144 of the recesses 141, 143.

The projection mechanism 27 is arranged at the opposite side (the left side as viewed in FIGS. 6 and 7) to the recess 141 with respect to the first metal mold 14. The first mold holding portion 102 is located between the first metal mold 14 and the projection mechanism 27. The first mold holding portion 102 and the projection mechanism 27 are fixed immovably. Thus, even though the force produced by the mold separating members 123 acts on the sloped surfaces 142, 144 of the corresponding recesses 141, 143, the first metal mold 14 is prevented from moving toward the first mold holding portion 102 and the projection mechanism 27.

Contrastingly, the second metal mold 15 is movable together with the sliding members 104. Thus, the second metal mold 15 is separated from the first metal mold 14 by the force produced by the mold separating members 123.

As each mold separating member 123 projects from the associated movable cylinder 120, the contact positions between the sloped surfaces 124, 124 of the mold separating member 123 and the sloped surfaces 142, 144 of the recesses 141, 143 are changed. This applies the force acting to move the mold separating member 123 away from the first metal mold 14 to the mold separating member 123 as indicated by the arrow in FIG. 13. However, the associated movable cylinder 120 in which the mold separating member 123 is received is slidably engaged with the rails 119 of the blocks 122. Thus, the aforementioned force acts to slide the movable cylinder 120 along the rails 119 against the urging force of the spring 133. This causes the mold separating member 123 to smoothly enter the corresponding recesses 141, 143 without applying excessive force on each portion of the mold separating mechanism 113, 114. The second metal mold 15 is thus separated from the first metal mold 14.

If the movable plate 28 moves in the axial direction of the bolts 39 when attraction and holding of the second metal mold 15 by the second mold holding portion 107 are suspended, the movable plate 28 approaches or separates from the second metal mold 15. This moves all the bolts 39 and all the drive mechanisms 42 in a common direction, together with the movable plate 28. Through such movement, the positions of all the bolts 39 and all the drive mechanisms 42 relative with the first metal mold 14 and the second metal mold 15 are changed.

Thus, to attach or detach the first metal mold 14 and the second metal mold 15 with respect to the injection molding machine 11, that is, to perform tooling change, mold separation is first carried out using the mold separating mechanisms 113, 114 and, then, the output shaft 111 of the electric motor 108 is rotated to rotate the screw shaft 109. The rotation of the screw shaft 109 is then transmitted to the sliding member 105 through the nut 112. This moves the sliding member 105, together with the movable plate 28, along the screw shaft 109 away from the second metal mold 15 (as indicated by the double-dotted chain lines in FIG. 6). As a result, the shafts 37 of the bolts 39 are disengaged from the through holes 31 of the second metal mold 15. At this stage, neither the first metal mold 14 nor the second metal mold 15 must be particularly moved. After all the bolts 39 become fully extracted from the through holes 31, rotation of the output shaft 111 of the electric motor 108 is suspended, thus stopping movement of the sliding member 105 and the movable plate 28.

In this state, all the bolts 39 are disengaged from the first metal mold 14 and the second metal mold 15. Thus, the bolts 39 do not restrict movement of the first and second metal molds 14, 15, particularly in a direction perpendicular to the axis of each bolt 39. Accordingly, the first metal mold 14 and the second metal mold 15 are moved in the direction perpendicular to the axis of the bolt 39 to be removed from the injection molding machine 11.

Then, a new pair of the first metal mold 14 and the second metal mold 15 that are targets of a subsequent cycle of molding of resin are mounted in the injection molding machine 11.

Next, in the manner opposite to the above-described manner, the movable plate 28 is moved toward the second metal mold 15 so that all the bolts 39 are received in the corresponding through holes 31. The movable plate 28 is thus attached to the second metal mold 15 and can be subjected to mold clamping by the mold clamping mechanisms 29.

Accordingly, the third embodiment has the following advantages in addition to the above-described advantages of items (1) to (6).

(7) The movable plate 28, which selectively approaches and separates from the second metal mold 15, is arranged at the opposite side to the first metal mold 14 with respect to the second metal mold 15. The shafts 37 of the bolts 39 are passed through and supported by the movable plate 28 in an axially movable manner, with the heads 38 of the bolts 39 located at the opposite side to the second metal mold 15 with respect to the movable plate 28. The drive mechanisms 42 are attached to the movable plate 28 at the same side as the heads 38 with respect to the movable plate 28. Thus, simply through movement of the movable plate 28 in the axial direction of each bolt 39, the positions of the bolts 39 and the drive mechanisms 42 are changed relative to the first and second metal molds 14, 15. This facilitates tooling change compared to the case in which the bolts 39 and the drive mechanisms 42 are separately attached to or detached from the first and second metal molds 14, 15 without using the movable plate 28.

(8) The advantage of item (7) becomes particularly pronounced in the following arrangement. Specifically, a plurality of sets of a through hole 31 and a corresponding internal threaded portion 34 are employed. A bolt 39 and a drive mechanism 42 are provided for each of the sets of the through holes 31 and the internal threaded portions 34. The bolts 39 and the drive mechanisms 42 of all the sets of the through holes 31 and the internal threaded portions 34 are mounted commonly in the movable plate 28, as in the third embodiment.

Specifically, as the common movable plate 28 moves in the axial direction of each bolt 39 and thus approaches or separates from the second metal mold 15, the bolts 39 and the drive mechanisms 42 of all the sets simultaneously move in the same direction as the movement direction of the movable plate 28, together with the movable plate 28. This changes the positions of all of the bolts 39 and all the drive mechanisms 42 relative to the first metal mold 14 and the second metal mold 15.

This shortens the time needed for tooling change and facilitates such tool change.

The present invention may be embodied in the following modified forms.

In each of the illustrated embodiments, the hydraulic washer 53 may be omitted. In this case, the axial force is produced only through extension amount of the shaft 37 (or the stud bolt 61) caused by rotation of the bolt 39 (or the nut 62). Thus, compared to the case in which the hydraulic washer 53 is employed, the electric motor 45 must be large-sized. However, the mold clamping device becomes small compared to the case in which a die plate or a tie bar is used.

The present invention may be used in an injection molding machine that moves a second metal mold in a vertical direction to cause the second metal mold to approach or separate from a first metal mold.

The movable plate 28, the stud bolt 61, and the nut 62 of the second embodiment may be used as in the third embodiment.

Specifically, a plurality of sets of a stud bolt 61 and a corresponding through hole 31 are employed. A nut 62 and a drive mechanism 42 are provided for each of the sets of the stud bolts 61 and the through holes 31. The nuts 62 and the drive mechanisms 42 are all mounted commonly in the movable plate 28.

This results in an operation similar to the operation of the third embodiment. The second embodiment thus obtains the same advantages as the third embodiment.

In other words, as the movable plate 28 moves in the axial direction of each stud bolt 61 and approaches or separates from the first metal mold 14 and the second metal mold 15, the nuts 62 and the drive mechanisms 42, together with the movable plate 28, move in the same direction as the movement direction of the movable plate 28. This changes the positions of the nuts 62 and the drive mechanisms 42 relative to the first metal mold 14 and the second metal mold 15.

Thus, in tooling change, each of the nuts 62 is removed from the distal end of the corresponding one of the stud bolts 61, which is formed solely by a shaft, by the associated one of the drive mechanisms 42. In this stage, using the electric motor 108 and the screw shaft 109, the movable plate 28 is moved away from the first metal mold 14 together with the second metal mold 15. When the stud bolts 61, which are fixed to the first metal mold 14, are disengaged from the through holes 31 of the second metal mold 15, the first metal mold 14 and the second metal mold 15 become separate from each other. Further, as the movable plate 28 is spaced from the second metal mold 15, the nuts 62 and the drive mechanisms 42 are also spaced from the second metal mold 15. This allows removal of the first and second metal molds 14, 15 from the injection molding machine 11. Afterwards, a new pair of a first metal mold 14 and a second metal mold 15 that are targets of a subsequent cycle of molding resin may be mounted in the injection molding machine 11.

Then, the movable plate 28, for example, is moved in the opposite direction to the aforementioned direction, or toward the first metal mold 14, together with the newly mounted second metal mold 15. This passes the stud bolts 61 through the through holes 31 and brings the nuts 62 into contact with the stud bolts 61. In this state, the nuts 62 are rotated by the drive mechanisms 42 to be threaded to the distal ends of the stud bolts 61. The movable plate 28 is thus attached to the first metal mold 14 and the second metal mold 15. In this state, the first and second metal molds 14, can be subjected to mold clamping.

That is, the positions of the nuts 62 and the drive mechanisms 42 are changed relative to the first and second metal molds 14, 15 simply through movement of the movable plate 28 in the axial direction of each stud bolt 61. This facilitates tooling change compared to the case in which the nuts 62 and the drive mechanisms 42 are separately attached to or detached from the first and second metal molds 14, 15 without using the movable plate 28.

Such advantage becomes particularly pronounced in the following arrangement. That is, a plurality of sets of a stud bolt 61 and a corresponding through hole 31 are employed. A nut 62 and a drive mechanism 42 are provided for each of the sets of the stud bolts 61 and the through holes 31. Further, all the nuts 62 and all the drive mechanisms 42 are mounted commonly in the movable plate 28, as in the above-described case.

Specifically, when the common movable plate 28 moves in the axial direction of each stud bolt 61 and approaches or separates from the first metal mold 14 and the second metal mold 15, the nuts 62 and the drive mechanisms 42 simultaneously move in the same direction as the movement direction of the movable plate 28 together with the movable plate 28. This changes the positions of the nuts 62 and the drive mechanisms 42 relative to the first metal mold 14 and the second metal mold 15.

This shortens the time needed for tooling change and facilitates such tooling change.

In the first and second embodiments, the molten resin may be supplied to the cavity 18 using a plurality of injection devices 24 as in the third embodiment.

Contrastingly, in the third embodiment, the molten resin may be supplied to the cavity 18 using a single injection device 24 as in the first and second embodiments.

In the third embodiment, the sloped surface 124 of the mold separating member 123 corresponding to the first metal mold 14 may be changed to a vertical surface. In this case, the sloped surface 142 of the recess 141 of the first metal mold 14 is also changed to a vertical surface. Thus, unlike the third embodiment, when the mold separating member 123 projects from the movable cylinder 120, the force that acts to move the mold separating member 123 away from the first metal mold 14 is not applied to the mold separating member 123. It is thus unnecessary to employ a mechanism that slides the movable cylinder 120 in which the mold separating member 123 is accommodated.

The invention claimed is:

1. A mold clamping mechanism used in an injection molding machine having a first metal mold and a second metal mold that selectively contacts and separates from the first metal mold, wherein, in molding of resin, the mold clamping mechanism presses the second metal mold contacting the first metal mold against the first metal mold, wherein the second metal mold has a through hole that extends in a movement direction of the second metal mold, wherein the first metal mold has an internal threaded portion that extends on a common line with the through hole and has an opening at a side surface facing the second metal mold, the mechanism comprising:

a bolt having a shaft and a head; and a drive mechanism that passes the shaft through the through hole in such a manner that the head of the bolt is arranged at the opposite side to the first metal mold with respect to the second metal mold and that a distal end of the shaft of the bolt is located at the same side as the first metal mold with respect to the second metal mold, wherein, with the second metal mold held in contact with the first metal mold, the drive mechanism rotates the bolt through the head in such a manner that the shaft is threaded to the internal threaded portion, thereby pressing the second metal mold against the first metal mold.

2. The mold clamping mechanism according to claim 1, wherein the drive mechanism has a motor including an output shaft and a rotation transmitting portion that transmits rotation of the output shaft of the motor to the head of the bolt.

3. The mold clamping mechanism according to claim 2, wherein axial force generation assisting means is arranged between the second metal mold and the head of the bolt, the axial force generation assisting means generating an axial force corresponding to the amount of extension of the shaft caused by rotation of the bolt.

4. The mold clamping mechanism according to claim 1, further comprising an urging member that constantly urges the bolt toward the internal threaded portion in an elastic manner.

5. The mold clamping mechanism according to claim 1, further comprising a movable plate that selectively approaches and separates from the second metal mold, wherein the shaft is passed through and supported by the movable plate in an axially movable manner with the head of the bolt arranged at the opposite side to the second metal mold with respect to the movable plate, and wherein the drive mechanism is attached to the movable plate at the same side as the head with respect to the movable plate.

6. The mold clamping mechanism according to claim 5, wherein the through hole and the internal threaded portion corresponding to the through hole form a first set, the mold clamping mechanism including a plurality of additional sets each including an additional through hole and an additional internal threaded portion corresponding to the additional through hole, wherein the bolt and the drive mechanism are provided for each of the first set and the additional sets, and wherein the bolts and the drive mechanisms of all the sets are mounted commonly in the movable plate.

7. A mold clamping mechanism used in an injection molding machine having a first metal mold and a second metal mold that selectively contacts and separates from the first metal mold, wherein, in molding of resin, the mold clamping mechanism presses the second metal mold contacting the first metal mold against the first metal mold, wherein the second metal mold has a through hole that extends in a movement direction of the second metal mold, the mechanism comprising:

a bolt formed by only a shaft, the shaft including a proximal end and a distal end;

a nut threaded to the distal end of the shaft; and a drive mechanism that rotates the nut in a fastening direction to press the second metal mold against the first metal mold in a state where the shaft is passed through the through hole with the proximal and distal ends of the shaft exposed from the through hole, the proximal end of the shaft is fixed to the first metal mold, the nut is threaded to the distal end of the shaft, and the second metal mold is held in contact with the first metal mold.

8. The mold clamping mechanism according to claim 7, wherein the drive mechanism includes a motor and a rotation transmitting portion that transmits rotation of the motor to the nut.

9. The mold clamping mechanism according to claim 8, wherein axial force generation assisting means is arranged between the second metal mold and the nut, the axial force generation assisting means generating an axial force corresponding to the amount of extension of the bolt caused by rotation of the nut.

10. The mold clamping mechanism according to claim 7, further comprising a movable plate that is arranged at the opposite side to the first metal mold with respect to the second metal mold and selectively approaches and separates from the second metal mold, wherein the nut threaded to the distal end of the shaft passed through the movable plate is located at the opposite side to the second metal mold with respect to the movable plate, and wherein the drive mechanism is attached to the movable plate.

11. The mold clamping mechanism according to claim 10, wherein the bolt and the through hole corresponding to the bolt form a first set, wherein the mold clamping mechanism includes an additional bolt and an additional through hole corresponding to the additional bolt, wherein the nut and the drive mechanism are provided for each of the sets of the bolts and the through holes, and wherein the nuts and the drive mechanisms of all the sets are mounted commonly in the movable plate.

12. The mold clamping mechanism according to claim 3, wherein the axial force generation assisting means has a cylinder and a piston accommodated in the cylinder in such a manner that the piston selectively projects from and retreats into the cylinder in the movement direction of the second metal mold, the axial force generation assisting means generating the axial force by projecting the piston from the cylinder through hydraulic pressure.

13. The mold clamping mechanism according to claim 9, wherein the axial force generation assisting means has a cylinder and a piston accommodated in the cylinder in such a manner that the piston selectively projects from and retreats into the cylinder in the movement direction of the second metal mold, the axial force generation assisting means generating the axial force by projecting the piston from the cylinder through hydraulic pressure.

14. An injection molding machine having a first metal mold and a second metal mold, wherein the injection molding machine forms a cavity by causing the second metal mold to contact the first metal mold, uses a mold clamping mechanism to press the second metal mold against the first metal mold, thereby performing mold clamping, and, in this state, injects a molten resin into the cavity to form a molded product, wherein the injection molding machine includes the mold clamping mechanism according to claim 1 as the mold clamping mechanism.

15. An injection molding machine having a first metal mold and a second metal mold, wherein the injection molding machine forms a cavity by causing the second metal mold to contact the first metal mold, uses a mold clamping mechanism to press the second metal mold against the first metal mold, thereby performing mold clamping, and, in this state, injects a molten resin into the cavity to form a molded product, wherein the injection molding machine includes the mold clamping mechanism according to claim 7 as the mold clamping mechanism.

16. The injection molding machine according to claim 14, wherein the second metal mold horizontally moves to selectively approach and separate from the first metal mold, and
wherein the molten resin is injected downward from an injection device arranged above the first metal mold and the second metal mold and supplied to the cavity.

17. The injection molding machine according to claim 15, wherein the second metal mold horizontally moves to selectively approach and separate from the first metal mold, and
wherein the molten resin is injected downward from an injection device arranged at a position located higher than the first metal mold and the second metal mold, and is supplied to the cavity.

\* \* \* \* \*